US 010317253B2

(12) United States Patent
Kato

(10) Patent No.: US 10,317,253 B2
(45) Date of Patent: Jun. 11, 2019

(54) OPTICAL ENCODER

(71) Applicant: Mitutoyo Corporation, Kawasaki, Kanagawa (JP)

(72) Inventor: Yoshiaki Kato, Urayasu (JP)

(73) Assignee: MITUTOYO CORPORATION, Kawasaki (JP)

( * ) Notice: Subject to any disclaimer, the term of this patent is extended or adjusted under 35 U.S.C. 154(b) by 289 days.

(21) Appl. No.: 15/177,499

(22) Filed: Jun. 9, 2016

(65) Prior Publication Data

US 2016/0363464 A1 Dec. 15, 2016

(30) Foreign Application Priority Data

Jun. 11, 2015 (JP) ................. 2015-118122

(51) Int. Cl.
*G01D 5/34* (2006.01)
*G01D 5/347* (2006.01)
*G01D 5/38* (2006.01)

(52) U.S. Cl.
CPC ..... *G01D 5/34715* (2013.01); *G01D 5/34746* (2013.01); *G01D 5/38* (2013.01)

(58) Field of Classification Search
CPC ... G01D 5/34715; G01D 5/34746; G01D 5/38
USPC ............ 250/231.13, 231.14, 231.15, 231.16, 250/231.17, 231.18, 231.1
See application file for complete search history.

(56) References Cited

U.S. PATENT DOCUMENTS

| 4,051,367 | A |  | 9/1977 | Sayce et al. |
|---|---|---|---|---|
| 4,979,827 | A |  | 12/1990 | Matsui |
| 5,026,164 | A |  | 6/1991 | Ichikawa |
| 5,067,816 | A |  | 11/1991 | Ichikawa |
| 5,666,196 | A |  | 9/1997 | Ishii et al. |
| 5,694,218 | A | * | 12/1997 | Fukui ................. G01D 5/38 250/237 G |
| 2005/0219546 | A1 |  | 10/2005 | Otsuka |

(Continued)

FOREIGN PATENT DOCUMENTS

| EP | 0509979 | 10/1992 |
|---|---|---|
| GB | 2247313 | 2/1992 |

(Continued)

OTHER PUBLICATIONS

European Search Report dated Jan. 5, 2017, 8 pages.

(Continued)

*Primary Examiner* — Thanh Luu
*Assistant Examiner* — Kevin Wyatt
(74) *Attorney, Agent, or Firm* — Rankin, Hill & Clark LLP

(57) ABSTRACT

A scale includes a scale grating formed with a period P. A light source grating includes a grating formed with a period 2P, the light source grating being disposed between a light source and the scale. Interference fringe detection means is configured to be able to detect a bright part of an interference fringe with the period P, the interference fringe being generated by the light source grating and the scale. The interference fringe detection means detects a first interference fringe formed by light coming from the scale and a second interference fringe formed by light coming from the scale, a position of a bright part of the second interference fringe being shifted from a position of a bright part of the first interference fringe by a half of the period P (i.e., P/2).

8 Claims, 17 Drawing Sheets

(56) References Cited

U.S. PATENT DOCUMENTS

| | | | |
|---|---|---|---|
| 2007/0125939 A1 | 6/2007 | Yaku et al. | |
| 2007/0267571 A1* | 11/2007 | Makinouchi | G01D 5/38 |
| | | | 250/231.13 |
| 2010/0328681 A1 | 12/2010 | Kapner | |
| 2012/0312972 A1* | 12/2012 | Tobiason | G01D 5/38 |
| | | | 250/231.1 |
| 2015/0346000 A1* | 12/2015 | Kato | G01D 5/24438 |
| | | | 250/231.1 |

FOREIGN PATENT DOCUMENTS

| | | |
|---|---|---|
| JP | 63-33604 | 2/1988 |
| JP | H01-217211 | 8/1989 |
| JP | 01-180615 | 12/1989 |
| JP | H02-302620 | 12/1990 |
| JP | 5-008427 | 2/1993 |
| JP | H10-002761 | 1/1998 |
| JP | 2003-322507 | 11/2003 |
| JP | 2004-239855 | 8/2004 |
| JP | 2005-114406 | 4/2005 |
| JP | 2005-257521 | 9/2005 |
| JP | 2009-264778 | 11/2009 |
| JP | 2011-007799 | 1/2011 |
| JP | 2015-078861 | 4/2015 |

OTHER PUBLICATIONS

Japanese Office Action issued Mar. 5, 2019 in the corresponding JP patent application 2015-118122, English translation included, 11 pages.

* cited by examiner

OPTICAL ENCODER

INCORPORATION BY REFERENCE

This application is based upon and claims the benefit of priority from Japanese patent application No. 2015-118122, filed on Jun. 11, 2015, the disclosure of which is incorporated herein in its entirety by reference.

BACKGROUND OF THE INVENTION

1. Field of the Invention

The present invention relates to an optical encoder.

2. Description of Related Art

As a device that detects a relative displacement between two relatively moving components, various encoders have been known. For example, as an example of a linear encoder, an optical encoder using a three-grating system has been proposed (Japanese Unexamined Patent Application Publication No. S63-33604).

The optical encoder using the three-grating system is explained hereinafter. FIG. 14 is a perspective view showing a configuration example of an optical encoder 800 using the three-grating system. The optical encoder 800 includes a scale 840 and a detection head 870. The detection head 870 moves relative to the scale 840 in a measurement direction (X-axis direction). The detection head 870 detects an amount of the relative movement of the detection head 870 with respect to the scale 840.

The scale 840 is equipped with a scale grating 841. The scale grating 841 includes light-transmitting parts 842 and non-transmitting parts 843. The light-transmitting parts 842 and the non-transmitting parts 843 are alternately arranged in the measurement direction (X-axis direction) with a period P (i.e., a cycle P).

The detection head 870 includes a light source 110, a light source grating 120, and interference fringe detection means 850. The light source grating 120 includes light-transmitting parts 121 and non-transmitting parts 122, and is disposed directly below the light source 110. The light-transmitting parts 121 and the non-transmitting parts 122 are alternately arranged in the measurement direction (X-axis direction) with a period 2P (i.e., a cycle 2P).

The interference fringe detection means 850 includes a light receiving grating 851 and a photo diode 852. The light receiving grating 851 includes light-transmitting parts 853 and non-transmitting parts 854, and is disposed directly above the photo diode 852. The light-transmitting parts 853 and the non-transmitting parts 854 are alternately arranged in the measurement direction (X-axis direction) with the period 2P. The photo diode 852 converts light that has passed through the light receiving grating 851 into an electric signal and an amount of the movement of the detection head 870 is detected based on a change in the strength of the electric signal.

In the optical encoder 800, the light source grating 120, the scale grating 841, and the light receiving grating 851 correspond to the three gratings that realize the three-grating system. The optical encoder 800 is configured so that the gap (G3) between the light source grating 120 and the scale 840 is equal to the gap (G4) between the scale 840 and the light receiving grating 851 (i.e., G3=G4).

A movement of the scale 840 and an appearance of interference fringes formed by the three gratings in the optical encoder 800 are briefly explained hereinafter. Here, a fact that every time the scale 840 moves in the measurement direction (X-axis direction) by a half of the period P (i.e., P/2) (hereinafter referred to as a "half period (P/2)"), a peak appears in the signal strength because of the three-grating system is explained with reference to FIGS. 15 to 17.

FIG. 15 schematically shows a cross-sectional configuration of the detection head 870 and the scale 840 in an initial state. FIG. 15 shows a cross section taken along a line XV-XV in FIG. 14. FIG. 15 shows that in the initial state, the grating of the light source grating 120 is not aligned with that of the scale grating 841. In other words, FIG. 15 shows a state in which there is no path through which the 0th-order light can pass through the light-transmitting parts of both the light source grating 120 and the scale grating 841. Since the light receiving grating 851 is arranged so that its grating is aligned with that of the light source grating 120, the grating of the scale grating 841 is not aligned with those of the light source grating 120 and the light receiving grating 851 in the state shown in FIG. 15.

In FIG. 15, to distinguish light-transmitting parts and non-transmitting part from one another, symbols 121A and 121B are added to a plurality of light-transmitting parts 121 of the light source grating 120 in turn from the left side and symbols 122A to 122C are added to a plurality of non-transmitting parts 122 thereof in turn from the left side. Further, symbols 842A to 842E are added to a plurality of light-transmitting parts 842 of the scale grating 841 in turn from the left side and symbols 843A to 843F are added to a plurality of non-transmitting parts 843 thereof in turn from the left side. Further, symbols 853A and 853B are added to a plurality of light-transmitting parts 853 of the light receiving grating 851 in turn from the left side and symbols 854A to 854C are added to a plurality of non-transmitting parts 854 thereof in turn from the left side. Note that for clarifying the figure, hatching is added in the non-transmitting parts 122A-122C, 843A-843F, and 854A-854C.

In the state shown in FIG. 15, bright parts of interference fringes are formed on the photo diode 852 by the interference between light rays which have passed through the light-transmitting parts of the light source grating 120 and the scale grating 841 and whose optical path lengths are equal to each other. For example, the optical path length of light that travels through a path "121A→842B→853A" is equal to that of light that travels through a path "121A→842C→853A". Therefore, a bright part of the interference fringes is formed on the light-transmitting part 853A of the light receiving grating 851.

As described above, it can be understood that in the state shown in FIG. 15, the light that has passed through the light source grating 120 and the scale grating 841 forms the interference fringes IP8 on the light receiving grating 851 in which bright parts appear at the intervals of the period P. In this state, a peak occurs in a detection signal output by the photo diode 852.

Next, a case in which the scale grating 841 gradually moves to the right from the state shown in FIG. 15 is examined. In this process, the interference fringes also gradually change their positions as the scale grating 841 moves. When the positions of the bright parts of the interference fringes are gradually shifted from the light-transmitting parts 853 of the light receiving grating 851, the signal strength of the detection signal output from the photo diode 852 gradually decreases.

FIG. 16 schematically shows the cross-sectional configuration of the detection head 870 and the scale 840 in the state subsequent to the state shown in FIG. 15. Similarly to FIG.

15, FIG. 16 shows the cross section taken along the line XV-XV in FIG. 14. A state after the scale 840 has subsequently moved by the period P as shown in FIG. 16 is examined. As understood from tracks of light rays in FIG. 16, for example, the optical path length of light that travels through a path "121A→842A→853A" (hereinafter referred to as a "light ray 81") is equal to that of light that travels through a path "121A→842C→853A" (hereinafter referred to as a "light ray 82"). However, the optical path length of light that travels through a path "121A→842B→853A" differs from that of the light rays 81 and 82. Therefore, no bright part of the interference fringes is formed on the light-transmitting part 853A.

As described above, it can be understood that in the state shown in FIG. 16, the light that has passed through the light source grating 120 and the scale grating 841 forms no interference fringe. In this state, no peak occurs in the detection signal output from the photo diode 852.

Needless to say, when the scale grating 841 further moves by the period P, the optical encoder has a state similar to the state shown in FIG. 15. Therefore, in this case, interference fringes similar to those in the state shown in FIG. 15 are formed.

FIG. 17 shows changes in the detection signal resulting from the movement of the scale grating 841. It can be understood that a peak occurs in the detection signal every time the scale grating 841 moves by the period P. That is, even when the period of the light source grating 120 and the light receiving grating 851 is set to the period 2P, which is twice the period P of the scale grating 841, the optical encoder can have a detection resolution of the period P. This is a significant advantage of the encoder using the three-grating system.

Further, in the encoder using the three-grating system, the signal strength changes in a repeated manner with a certain period (i.e., changes every time the scale grating 841 moves by the period P). Therefore, it is possible to perform interpolation in which one signal period (i.e., one signal cycle) is further divided into sections in order to detect the displacement of the scale grating 841 with an accuracy smaller than the signal period (period P). Needless to say, compared to the resolution in the case where interpolation is performed for the period 2P, which is twice the period P, the resolution can be increased by a factor of two when interpolation is performed for the period P.

SUMMARY OF THE INVENTION

The present inventors have found the following problem. As explained above, a peak occurs in the detection signal every time the scale grating 841 moves by the period P because of the three-grating system. In general, an encoder based on the three-grating system, using a light source grating, a scale grating, and a light receiving grating, all of which have a period P, can provide a detection signal in which a peak occurs every time the scale grating moves by a period P/2. In contrast to this, the period of the light source grating and the light receiving grating of the above-described optical encoder 800 is set to the period 2P, which is twice the period P, so that the necessary manufacturing accuracy for the optical encoder 800 can be relaxed (i.e., lowered), thus making the manufacture thereof easier. However, because of this, the detection resolution is lowered from P/2 to P. Therefore, the detection accuracy is lowered even when interpolation is performed for the detection signal.

The present invention has been made in view of the above-described circumstances and an object thereof is to provide an optical encoder having a detection resolution equivalent to a half of the period P (i.e., P/2) according to the relative movement of the grating scale having the period P, and which can be easily manufactured.

A first exemplary aspect of the present invention is an optical encoder including:

a light source that emits light;

a scale including a scale grating formed with a predetermined period;

a light source grating including a grating formed with a period twice the predetermined period, the light source grating being disposed between the light source and the scale; and interference fringe detection means configured to be able to detect a bright part of an interference fringe with the predetermined period, the interference fringe being generated by the light source grating and the scale, in which the interference fringe detection means detects a first interference fringe formed by light coming from the scale and a second interference fringe formed by light coming from the scale, a position of a bright part of the second interference fringe being shifted from a position of a bright part of the first interference fringe by a half of the predetermined period.

A second exemplary aspect of the present invention is the above-described optical encoder in which the scale includes at least two scale gratings formed with the predetermined period, and the at least two scale gratings are arranged in parallel and neighboring scale gratings are shifted from each other by a half of the predetermined period.

A third exemplary aspect of the present invention is the above-described optical encoder in which the scale includes an even number of scale gratings.

A fourth exemplary aspect of the present invention is the above-described optical encoder in which a width of an area where the at least two scale gratings are arranged is shorter than a width of the light source grating, the widths being widths in a direction in which the at least two scale gratings are arranged in parallel.

A fifth exemplary aspect of the present invention is the above-described optical encoder in which the light source grating includes at least two gratings formed with the period twice the predetermined period, and the at least two gratings are arranged in parallel and neighboring gratings are shifted from each other by the predetermined period.

A sixth exemplary aspect of the present invention is the above-described optical encoder in which the light source scale includes an even number of gratings.

A seventh exemplary aspect of the present invention is the above-described optical encoder in which the interference fringe detection means detects an interference fringe in which the first and second interference fringes are combined.

An eighth exemplary aspect of the present invention is the above-described optical encoder in which the interference fringe detection means includes:

a light receiving grating including a grating formed with the predetermined period; and light receiving means for detecting light that has passed through the light receiving grating.

A ninth exemplary aspect of the present invention is an optical encoder including:

a light source that emits light;

a scale including a staggered-pattern grating formed on a predetermined plane with a first period in an X-axis direction and a second period in a Y-axis direction, the X-axis direction being in parallel with the predetermined plane, the Y-axis direction being in parallel with the predetermined plane and intersecting the X-axis direction;

an X-axis direction light source grating including a grating formed in the X-axis direction with a period twice the first period, the X-axis light source grating being disposed between the light source and the scale;

a Y-axis direction light source grating including a grating formed in the Y-axis direction with a period twice the second period, the Y-axis light source grating being disposed between the light source and the scale;

X-axis direction interference fringe detection means configured to be able to detect a bright part of an interference fringe with the first period, the interference fringe being generated by the X-axis direction light source grating and the scale; and Y-axis direction interference fringe detection means configured to be able to detect a bright part of an interference fringe with the second period, the interference fringe being generated by the Y-axis direction light source grating and the scale, in which the X-axis direction interference fringe detection means detects a first interference fringe formed by light coming from the scale and a second interference fringe formed by light coming from the scale, a position of a bright part of the second interference fringe being shifted from a position of a bright part of the first interference fringe by a half of the first predetermined period, and the Y-axis direction interference fringe detection means detects a third interference fringe formed by light coming from the scale and a fourth interference fringe formed by light coming from the scale, a position of a bright part of the fourth interference fringe being shifted from a position of a bright part of the third interference fringe by a half of the second predetermined period.

According to the present invention, it is possible to provide an optical encoder having a detection resolution equivalent to a half of the period P (i.e., P/2) according to the relative movement of the grating scale having the period P, and which can be easily manufactured.

The above and other objects, features and advantages of the present invention will become more fully understood from the detailed description given hereinbelow and the accompanying drawings which are given by way of illustration only, and thus are not to be considered as limiting the present invention.

DESCRIPTION OF THE EXEMPLARY EMBODIMENTS

Exemplary embodiments according to the present invention are explained hereinafter with reference to the drawings. The same symbols are assigned to the same components throughout the drawings, and their duplicated explanation is omitted as appropriate.

First Exemplary Embodiment

Figure 1:
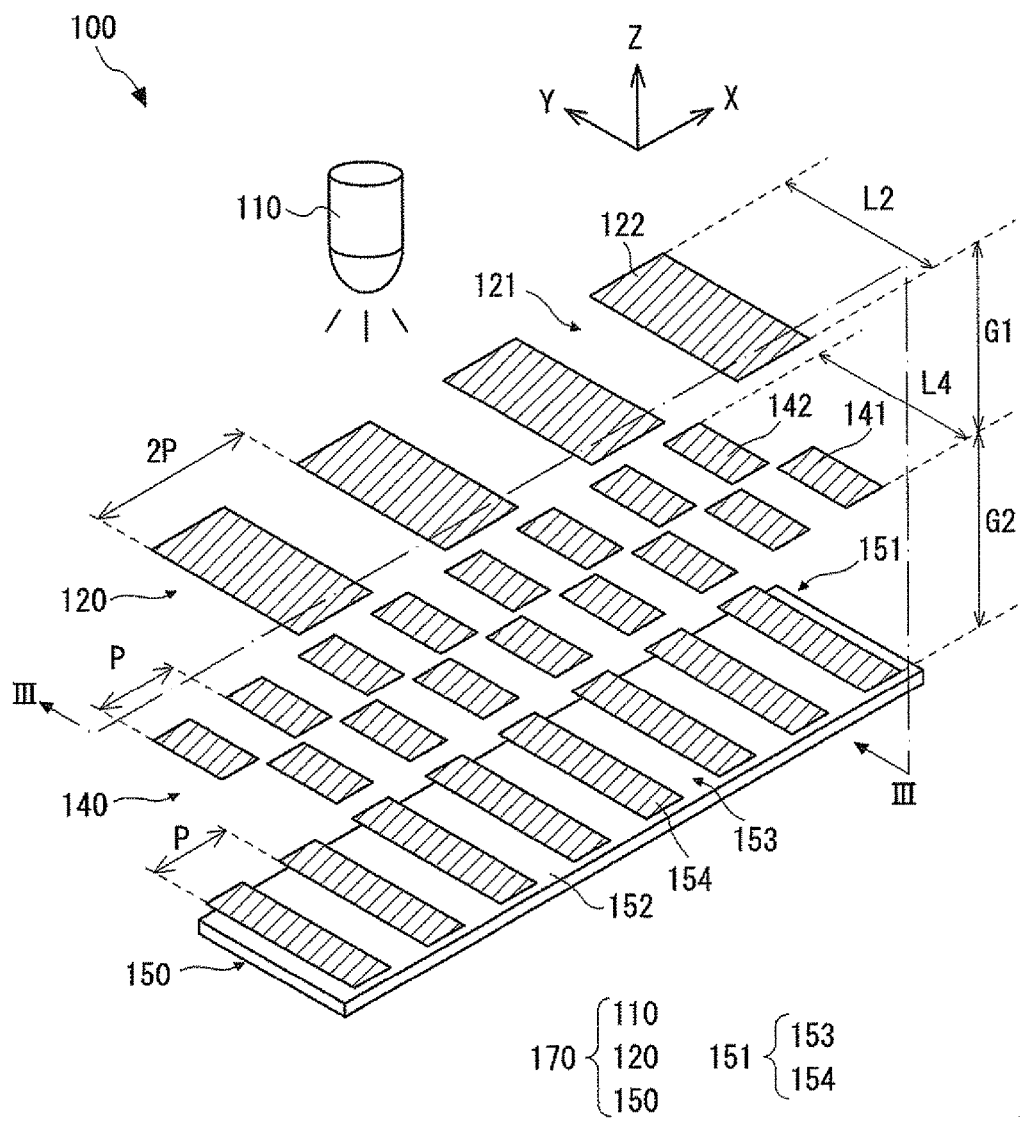
FIG. 1 is a perspective view schematically showing a configuration of an optical encoder according to a first exemplary embodiment.

An optical encoder 100 according to a first exemplary embodiment is explained. FIG. 1 is a perspective view schematically showing a configuration of the optical encoder 100 according to the first exemplary embodiment. The optical encoder 100 includes a scale 140 and a detection head 170. In the optical encoder 100, the detection head 170 moves relative to the scale 140 in a measurement direction (X-axis direction in FIG. 1) and detects an amount of the relative movement of the detection head 170 with respect to the scale 140 in the measurement direction (X-axis direction). Note that for clarifying the figure, hatching is added in each of the non-transmitting parts (which are described later) in FIG. 1 and the subsequent figures.

Figure 2:
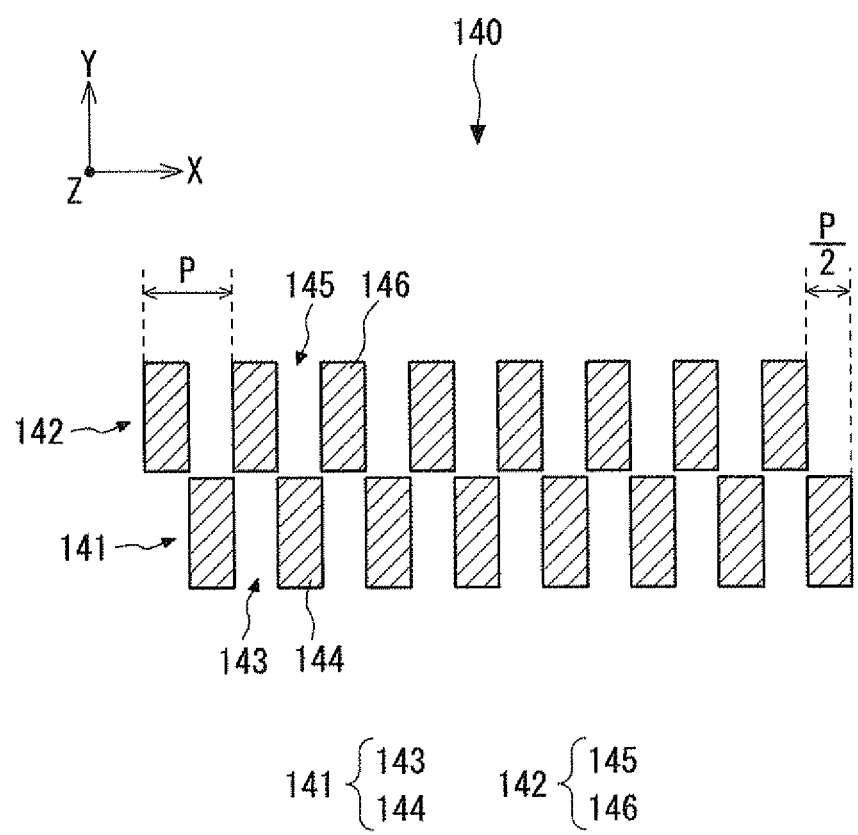
FIG. 2 is a top view schematically showing a configuration of a scale according to the first exemplary embodiment.

The scale 140 is explained in detail. FIG. 2 is a top view schematically showing a configuration of the scale 140 according to the first exemplary embodiment. In the scale 140, a first scale grating 141 and a second scale grating 142 are provided (or formed) on a glass substrate (not shown). A plurality of unit gratings constituting the first scale grating 141 are arranged in the X-axis direction, which is in parallel with the measurement direction. Similarly, a plurality of unit gratings constituting the second scale grating 142 are arranged in the measurement direction (X-axis direction). Further, the first and second scale gratings 141 and 142 are arranged side by side in the Y-axis direction on the scale 140.

Note that the Y-axis direction is a direction that is perpendicular to (or intersects) the measurement direction (X-axis direction) and in parallel with the plane where the first and second scale gratings 141 and 142 of the scale 140 are disposed. That is, the plane where the first and second scale gratings 141 and 142 of the scale 140 are disposed is an X-Y plane.

The first scale grating 141 includes light-transmitting parts 143 and non-transmitting parts 144. The light-transmitting parts 143 and the non-transmitting parts 144 are alternately arranged in the measurement direction (X-axis direction) with a period P (i.e., a cycle P). The second scale grating 142 includes light-transmitting parts 145 and non-transmitting parts 146. The light-transmitting parts 145 and the non-transmitting parts 146 are alternately arranged in the measurement direction (X-axis direction) with the period P. Note that the first and second scale gratings 141 and 142 are arranged so that they are shifted from each other by a half period (P/2) in the measurement direction (X-axis direction).

The detection head 170 is explained in detail. The detection head 170 includes a light source 110, a light source grating 120, and interference fringe detection means 150.

The light source 110 emits light. As the light source 110, for example, an LED (Light Emitting Diode), a laser diode, an SLED (Self-Scanning Light Emitting Device), or an OLED (Organic light-emitting diode) may be used.

The light source grating 120 includes light-transmitting parts 121 and non-transmitting parts 122, and is disposed directly below the light source 110. The light-transmitting parts 121 and the non-transmitting parts 122 are alternately arranged in the measurement direction (X-axis direction) with a period twice as long as the period of the scale 140, i.e., with a period 2P (hereinafter also referred to as a "double period") on a glass substrate (not shown).

Note that in the following explanation, the term "period" means the period P, which is the period of the scale 140, unless otherwise specified. Therefore, the period of the light source grating 120 is referred to as the "double period 2P" to differentiate it from the period P of the scale 140.

The width L2 in the short-side direction (Y-axis direction) of the light source grating 120 is longer than the width L4 in the short-side direction of the area where the first and second scale gratings 141 and 142 are arranged. As a result, light that has passed through the light source grating 120 is uniformly applied to the first and second scale gratings 141 and 142.

The interference fringe detection means 150 detects interference fringes generated by the light source grating 120 and the scale 140. The interference fringe detection means 150 includes a light receiving grating 151 and a photo diode 152. The light receiving grating 151 includes light-transmitting parts 153 and non-transmitting parts 154, and is disposed directly above the photo diode 152. The light-transmitting parts 153 and the non-transmitting parts 154 are alternately arranged in the measurement direction (X-axis direction) with the period P. The photo diode 152 converts light that has passed through the light receiving grating 151 into a detection signal, which is an electric signal. The strength of the detection signal changes according to the strength (or intensity) of the received light. As a result, an amount of the movement of the detection head 170 is detected based on changes in the electric signal.

In the optical encoder 100, the light source grating 120, each of the first and second scale gratings 141 and 142 of the scale 140, and the light receiving grating 151 correspond to the three gratings that realize the three-grating system. In this configuration, as described above, the optical encoder 100 is configured so that the grating period of the light source grating 120 is the double period 2P and the grating period of each of the first and second scale gratings 141 and 142 and the light receiving grating 151 is the period P. Further, the optical encoder 100 is configured so that the gap (G1) between the light source grating 120 and the scale 140 is equal to the gap (G2) between the scale 140 and the light receiving grating 151 (i.e., G1=G2).

The photo diode 152 detects interference fringes formed on the light-transmitting parts 153 of the light receiving grating 151 and outputs a detection signal according to the strength of the interference fringes. Note that for the interference fringe detection means 150, a photo diode array in which a plurality of photo diodes are arranged may be used, instead of using the light receiving grating 151 and the photo diode 152. In this exemplary embodiment, the interference fringe detection means 150 is configured to output a sine-wave single-phase signal. Note that the interference fringe detection means 150 may be configured in such a manner that four light receiving gratings 151 whose phases are shifted from one another by $\pi/4$ are disposed so that signals having an A+ phase, a B+ phase, an A− phase, and a B− phase, whose phases are shifted from one another by $\pi/4$, are output.

Next, an operation of the optical encoder 100 is explained. The light emitted from the light source 110 is diffracted as the light passes through the light source grating 120, and becomes coherent light. Since a number of light-transmitting parts 121 are disposed in the light source grating 120, the light that has passed through the light source grating 120 functions as if it is emitted from a light source in which a number of linear light source elements each of which extends in the Y-axis direction are arranged in the measurement direction (X-axis direction). The light that has passed through the light source grating 120 is diffracted by the first and second scale gratings 141 and 142 of the scale 140. The light diffracted by the first and second scale gratings 141 and 142 reaches the light receiving grating 151 and thereby forms interference fringes.

Figure 3:
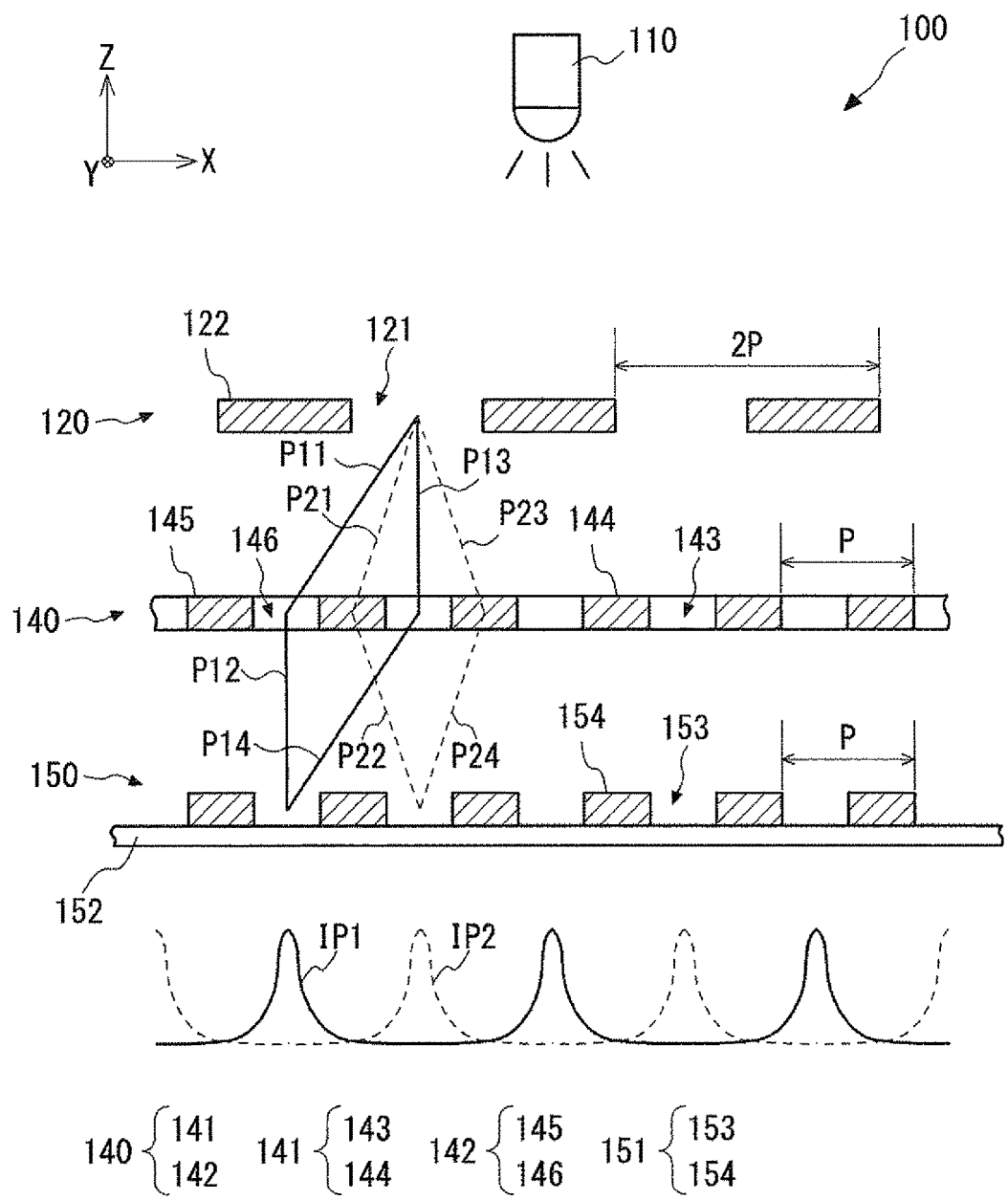
FIG. 3 schematically shows a cross-sectional configuration of a detection head and a scale when a light source grating, the scale, and a light receiving grating have a first positional relation.

FIG. 3 schematically shows a cross-sectional configuration of the detection head 170 and the scale 140 when the light source grating 120, the scale 140, and the light receiving grating 151 have a first positional relation. FIG. 3 shows a cross section taken along a line III-III in FIG. 1. In FIG. 3, for clarifying the figure, hatching is added in the light-transmitting parts 143 of the first scale grating 141, while the light-transmitting parts 145 of the second scale grating 142 are indicated by outlined rectangles.

The first positional relation shown in FIG. 3 means a state in which the light-transmitting parts of the light source grating 120, the first scale grating 141, and the light receiving grating 151 are aligned with each other, i.e., a state in which there are paths through which the 0th-order light that has passed through the light source grating can pass through the light-transmitting parts 143 of the first scale grating 141.

In other words, the first positional relation means a state in which the centers in the X-direction of the light-transmitting parts 121 of the light source grating 120, the light-transmitting parts 143 of the first scale grating 141, and the light-transmitting parts 153 of the light receiving grating 151 are aligned with each other in the Y-direction.

Interference fringes formed by the light that has passed through the first scale grating 141 of the scale 140 in the first positional relation are explained hereinafter. As shown in FIG. 3, the light that passed through the light source grating 120 is diffracted by the first scale grating 141. In the first positional relation, the light that has been diffracted by the light source grating 120 and then traveled through an optical path P11 is diffracted again by the first scale grating 141 and reaches the light receiving grating 151 through an optical path P12. Further, the 0th-order light that has passed through the light source grating 120 and then travelled through an optical path P13 is diffracted by the first scale grating 141 and reaches the light receiving grating 151 by traveling through an optical path P14.

In this configuration, the optical path P11 has a length equal to that of the optical path P14, and the optical path P12 has a length equal to that of the optical path P13. As a result, the light beams that have reached the light-transmitting parts 153 of the light receiving grating 151 interfere and strengthen each other, thus forming interference fringes. The interference fringes formed by the light diffracted by the first scale grating 141 in the first positional relation are referred to as "interference fringes IP1" (first interference fringes). The interval between bright parts of the interference fringes IP1, which is received (i.e., detected) by the photo diode 152, is equal to the double period 2P.

Next, interference fringes formed by the light that has passed through the second scale grating 142 of the scale 140 in the first positional relation are explained. As described above, the second scale grating 142 is shifted from the first scale grating 141 by the half period (P/2) in the measurement direction (X-axis direction). Therefore, in the first positional relation, the light that has been diffracted by the light source grating 120 and then traveled through an optical path P21 is diffracted again by the second scale grating 142 and reaches the light receiving grating 151 through an optical path P22. Further, the light that has been diffracted by the light source grating 120 and then traveled through an optical path P23 is diffracted again by the second scale grating 142 and reaches the light receiving grating 151 through an optical path P24.

In this configuration, the lengths of the optical paths P21 to P24 are equal to each other. As a result, the light beams that have reached the light-transmitting parts 153 of the photo diode 151 interfere and strengthen each other, thus forming interference fringes. Hereinafter, the interference fringes formed by the light diffracted by the second scale grating 142 in the first positional relation are referred to as "interference fringes IP2" (second interference fringes). The interval between bright parts of the interference fringes IP2, which is received (i.e., detected) by the photo diode 152, is equal to the double period 2P.

Since the first scale grating 141 and the second scale grating 142 are arranged so that they are shifted from each other by the half period (P/2) in the measurement direction (X-axis direction), the interference fringes IP1 and IP2 are similarly shifted from each other by the half period (P/2) in the measurement direction (X-axis direction). Therefore, when the interference fringes IP1 and IP2 are combined with (or overlaid on) each other, the bright parts of the resultant interference fringes are formed with the period P on the photo diode 152.

Note that the optical path of the light that forms the interference fringes IP1 differs from the optical path of the light that forms the interference fringes IP2 as shown in FIG. 3. Therefore, even when the phases of the interference fringes IP1 and IP2 are the same as each other, their strengths could differ from each other.

Figure 4:
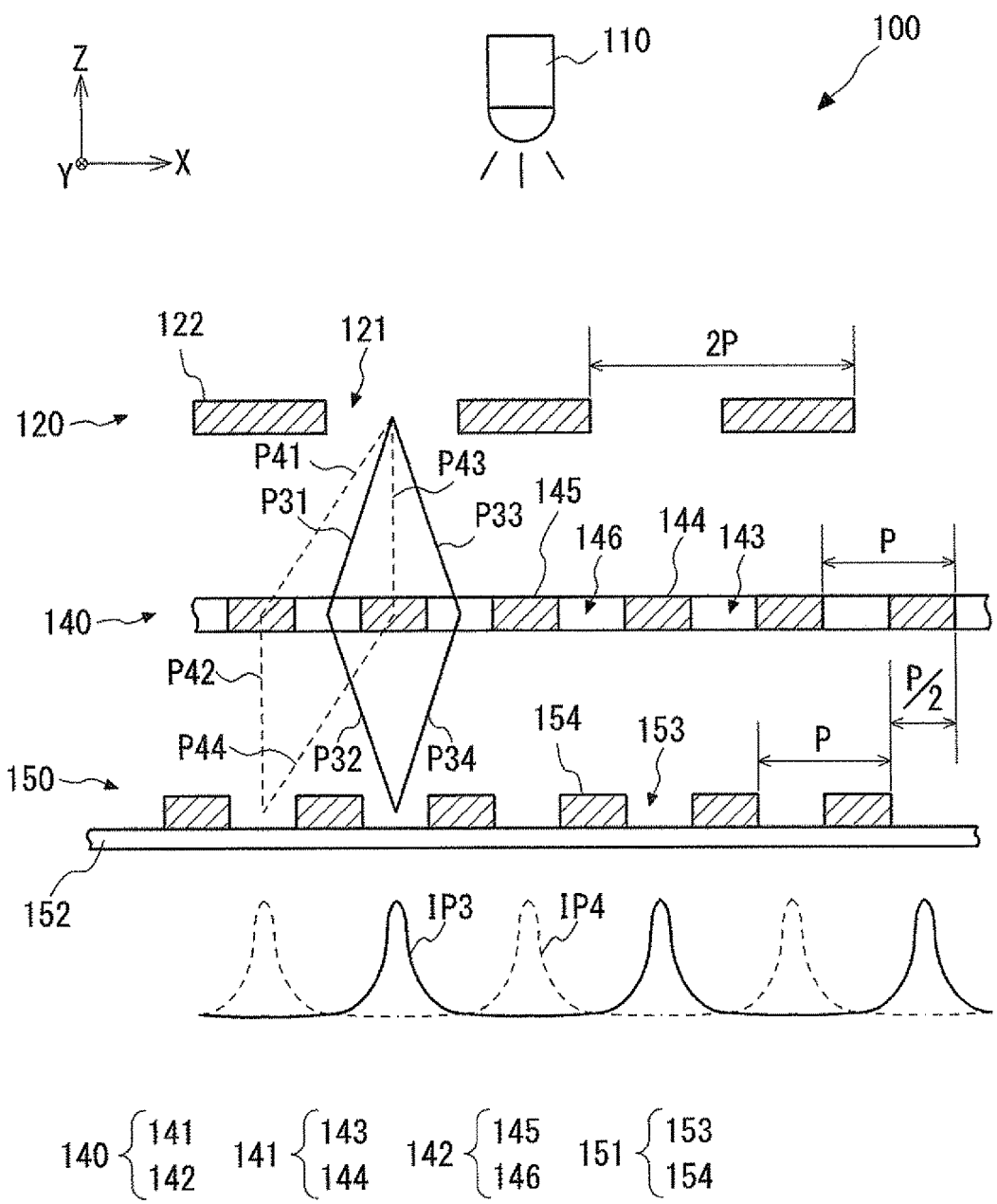
FIG. 4 schematically shows a cross-sectional configuration of the detection head and the scale when the light source grating, the scale, and the light receiving grating have a second positional relation.

Next, a case in which the detection head 170 is displaced relative to the scale 140 by the half period (P/2) in the measurement direction (X-axis direction) (hereinafter referred to as a "second positional relation") is explained. FIG. 4 schematically shows a cross-sectional configuration of the detection head 170 and the scale 140 when the light source grating 120, the scale 140, and the light receiving grating 151 have the second positional relation. Similarly to FIG. 3, FIG. 4 shows a cross section taken along the line III-III in FIG. 1. In FIG. 4, for clarifying the figure, hatching is added in the light-transmitting parts 143 of the first scale grating 141, while the light-transmitting parts 145 of the second scale grating 142 are indicated by outlined rectangles as in the case of FIG. 3.

In this case, the second positional relation shown means a state in which the light-transmitting parts of the light source grating 120 and the light receiving grating 151 are shifted from the light-transmitting parts 143 of the first scale grating 141 by the half period (P/2) in the measurement direction (X-axis direction), i.e., a state in which the 0th-order light that has passed through the light source grating is blocked by the non-transmitting parts 144 of the first scale grating 141. In other words, the second positional relation means a state in which the centers in the X-direction of the light-transmitting parts 121 of the light source grating 120, the non-transmitting parts 144 of the first scale grating 141, and the light-transmitting parts 153 of the light receiving grating 151 are aligned with each other in the Y-direction.

Interference fringes formed by the light that has passed through the first scale grating 141 of the scale 140 in the second positional relation are explained hereinafter. As shown in FIG. 4, the light that passed through the light source grating 120 is diffracted by the first scale grating 141. In the second positional relation, the light that has been diffracted by the light source grating 120 and then traveled through an optical path P31 is diffracted again by the first scale grating 141 and reaches the light receiving grating 151 through an optical path P32. Further, the light that has been diffracted by the light source grating 120 and then travelled through an optical path P33 is diffracted again by the first scale grating 141 and reaches the light receiving grating 151 by traveling through an optical path P34.

In this configuration, the lengths of the optical paths P31 to P34 are equal to each other. As a result, the light beams that have reached the light-transmitting parts 153 of the light receiving grating 151 interfere and strengthen each other, thus forming interference fringes. The interference fringes formed by the light diffracted by the first scale grating 141 in the second positional relation are referred to as "interference fringes IP3" (second interference fringes). The interval between bright parts of the interference fringes IP3, which is received (i.e., detected) by the photo diode 152, is equal to the double period 2P.

Next, interference fringes formed by the light that has passed through the second scale grating 142 of the scale 140 in the second positional relation are explained. As described above, the second scale grating 142 is shifted from the first scale grating 141 by the half period (P12) in the measurement direction (X-axis direction). Therefore, in the second positional relation, the light that has been diffracted by the light source grating 120 and then traveled through an optical path P41 is diffracted again by the second scale grating 142 and reaches the light receiving grating 151 through an optical path P42. Further, the 0th-order light that has passed through the light source grating 120 and then travelled through an optical path P43 is diffracted by the second scale grating 142 and reaches the light receiving grating 151 through an optical path P44.

In this configuration, the optical path P41 has a length equal to that of the optical path P44, and the optical path P42 has a length equal to that of the optical path P43. As a result, the light beams that have reached the light-transmitting parts 153 of the light receiving grating 151 interfere and strengthen each other, thus forming interference fringes. The interference fringes formed by the light diffracted by the second scale grating 142 in the second positional relation are referred to as "interference fringes IP4" (first interference fringes). The interval between bright parts of the interference fringes IP4, which is received (i.e., detected) by the photo diode 152, is equal to the double period 2P.

Since the first scale grating 141 and the second scale grating 142 are arranged so that they are shifted from each other by the half period (P/2) in the measurement direction (X-axis direction), the interference fringes IP3 and IP4 are similarly shifted from each other by the half period (P/2) in the measurement direction (X-axis direction). Therefore, when the interference fringes IP3 and IP4 are combined with (or overlaid on) each other, the bright parts of the resultant interference fringes are formed with the period P on the photo diode 152.

Note that the optical path of the light that forms the interference fringes IP3 differs from the optical path of the light that forms the interference fringes IP4 as shown in FIG. 4. Therefore, even when the phases of the interference fringes IP3 and IP4 are the same as each other, their strengths could differ from each other.

However, by referring to FIGS. 3 and 4, it can be understood that the optical paths P11 to P14 in the first positional relation are equivalent to the optical paths P41 to P44, respectively, in the second positional relation. That is, the interference fringes IP1 and IP4 are formed by the interference of light that has traveled through optical paths similar to each other (i.e., the above-described first interference fringes). Therefore, it can be understood that the strengths of the bright parts of the interference fringes IP1 and IP4 are similar to each other.

Further, it can be understood that the optical paths P21 to P24 in the first positional relation are equivalent to the optical paths P31 to P34, respectively, in the second positional relation. That is, the interference fringes IP2 and IP3 are formed by the interference of light that has traveled through optical paths similar to each other (i.e., the above-described second interference fringes). Therefore, it can be understood that the strengths of the bright parts of the interference fringes IP2 and IP3 are similar to each other.

Based on the above-described matters, it can be understood that the sum total of the strengths (i.e., the intensities) of the bright parts of the interference fringes IP1 and IP4 in the first positional relation is equal to the sum total of the strengths (i.e., the intensities) of the bright parts of the interference fringes IP2 and IP3 in the second positional relation. That is, the strength (i.e., the intensity) of the light detected by the photo diode 152 becomes uniform every time the detection head 170 is displaced relative to the scale 140 by the half period (P/2) in the measurement direction (X-axis direction). As a result, it is possible to make the strengths of the peaks, which occur at intervals of the half period (P/2) in the detection signal output from the photo diode 152, uniform.

According to this configuration, it is possible to improve the resolution of the detection signal to the half period (P/2) even when the period of the light source grating is the double period 2P. Further, it can be understood that compared to the case where the period of the light source grating is P, the optical encoder can be easily manufactured.

Second Exemplary Embodiment

Figure 5:
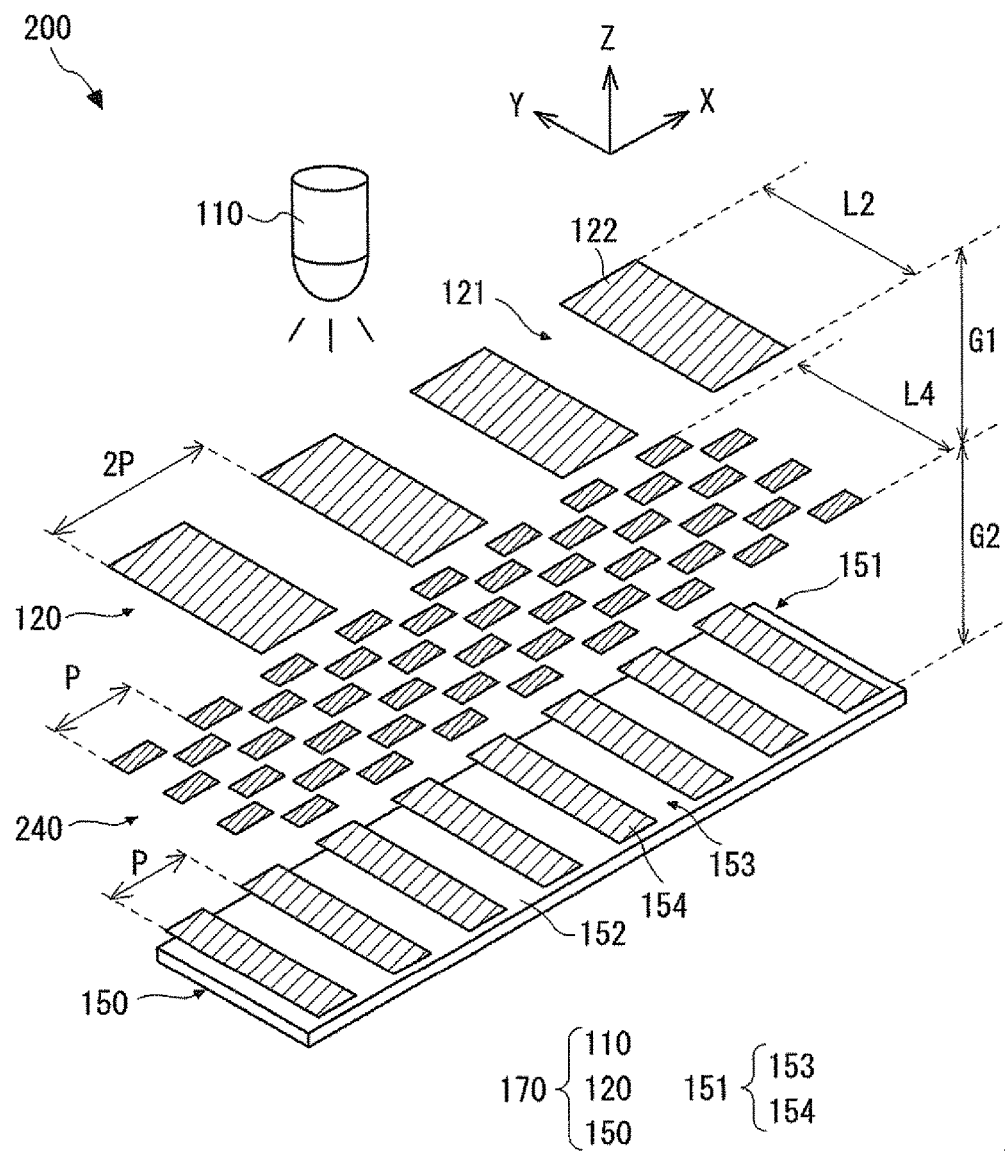
FIG. 5 is a perspective view schematically showing a configuration of an optical encoder according to a second exemplary embodiment.

An optical encoder 200 according to a second exemplary embodiment is explained. FIG. 5 is a perspective view schematically showing a configuration of the optical encoder 200 according to the second exemplary embodiment. The optical encoder 200 has a configuration that is obtained by replacing the scale 140 with a scale 240 in the optical encoder 100 according to the first exemplary embodiment.

Figure 6:
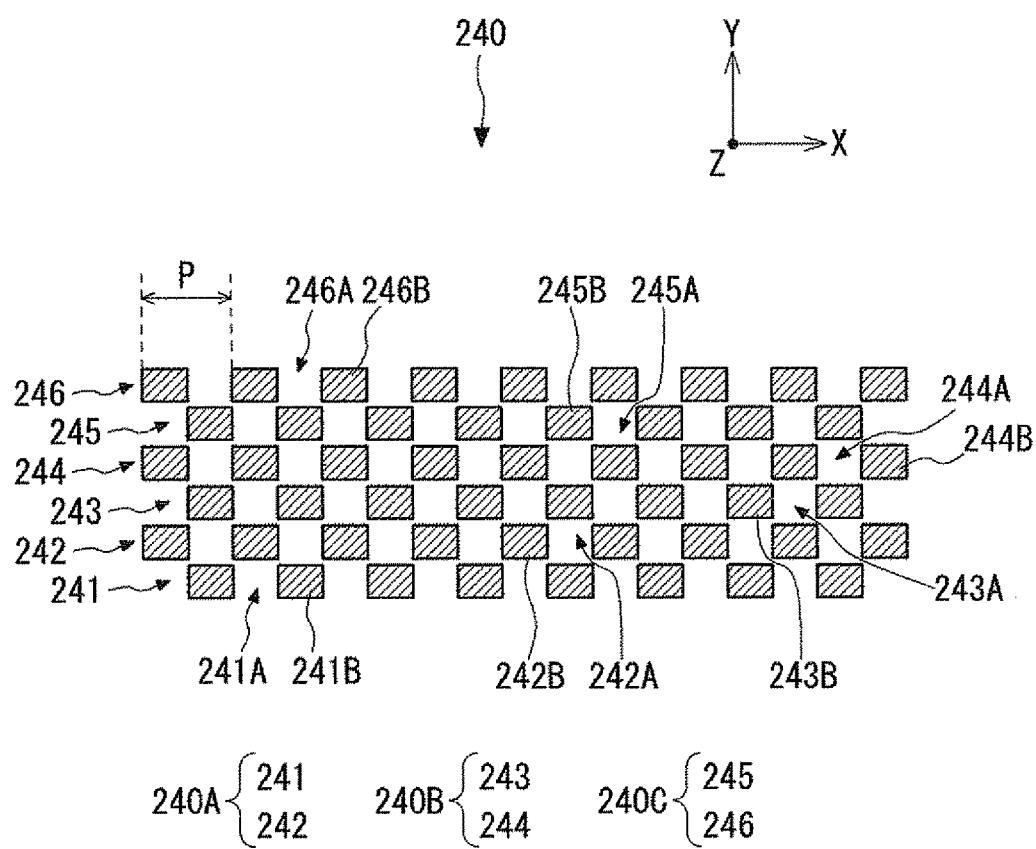
FIG. 6 is a plan view schematically showing a configuration of a scale according to the second exemplary embodiment.

The scale 240 is explained in detail. FIG. 6 is a plan view schematically showing a configuration of the scale 240 according to the second exemplary embodiment. In the optical encoder 200, the scale 240 includes a first scale grating 241, a second scale grating 242, a third scale grating 243, a fourth scale grating 244, a fifth scale grating 245, and a sixth scale grating 246 arranged in the Y-axis direction in this listed order on a glass substrate (not shown).

Each of the first, third and fifth scale gratings 241, 243 and 245 has a configuration similar to that of the first scale grating 141 of the optical encoder 100 according to the first exemplary embodiment, except that the length of the light-transmitting parts and the non-transmitting parts in the Y-axis direction differs from that of the first scale grating 141. Each of the second, fourth and sixth scale gratings 242, 244 and 246 has a configuration similar to that of the second scale grating 142 of the optical encoder 100 according to the first exemplary embodiment, except that the length of the light-transmitting parts and the non-transmitting parts in the Y-axis direction differs from that of the second scale grating 142.

In FIG. 6, the light-transmitting parts 241A and the non-transmitting parts 241B of the first scale grating 241 correspond to the light-transmitting parts 143 and the non-transmitting parts 144, respectively, of the first scale grating 141. The light-transmitting parts 242A and the non-transmitting parts 242B of the second scale grating 242 correspond to the light-transmitting parts 145 and the non-transmitting parts 146, respectively, of the second scale grating 142. The light-transmitting parts 243A and the non-transmitting parts 243B of the third scale grating 243 correspond to the light-transmitting parts 143 and the non-transmitting parts 144, respectively, of the first scale grating 141. The light-transmitting parts 244A and the non-transmitting parts 244B of the fourth scale grating 244 correspond to the light-transmitting parts 145 and the non-transmitting parts 146, respectively, of the second scale grating 142. The light-transmitting parts 245A and the non-transmitting parts 245B of the fifth scale grating 245 correspond to the light-transmitting parts 143 and the non-transmitting parts 144, respectively, of the first scale grating 141. The light-transmitting parts 246A and the non-transmitting parts 246B of the sixth scale grating 246 correspond to the light-transmitting parts 145 and the non-transmitting parts 146, respectively, of the second scale grating 142.

That is, it can be understood that the scale 240 has substantially a configuration in which three pairs each of which is composed of the first and second scale gratings 141 and 142 of the scale 140 according to the first exemplary embodiment are arranged in the Y-axis direction. In FIG. 6, the pair of the first scale grating 241 (corresponding to the first scale grating 141) and the second scale grating 242 (corresponding to the second scale grating 142) is referred to as a "pair 240A". The pair of the third scale grating 243 (corresponding to the first scale grating 141) and the fourth scale grating 244 (corresponding to the second scale grating 142) is referred to as a "pair 240B". The pair of the fifth scale grating 245 (corresponding to the first scale grating 141) and the sixth scale grating 246 (corresponding to the second scale grating 142) is referred to as a "pair 240C". The other configuration of the optical encoder 200 is similar to that of the optical encoder 100 and therefore its explanation is omitted.

Advantages of the optical encoder 200 over the optical encoder 100 are explained. In this configuration, the three pairs 240A, 240B and 240C are arranged in the Y-axis direction in a repeated manner. Therefore, even when the light source grating 120 and the scale 240 are displaced in the Y-axis direction, the change in the ratio between the strength (i.e., the intensity) of the light incident on the first, third and fifth scale gratings 241, 243 and 245 and that of the light incident on the second, fourth and sixth scale gratings 242, 244 and 246 can be reduced. As a result, the changes in the ratio between the strength of the first interference fringes incident on (or detected by) the photo diode 152 and that of the second interference fringes can be reduced. Therefore, it is possible to reduce the interpolation error in the detection signal output from the photo diode 152 that is caused when the light source grating 120 and the scale 240 are displaced in the Y-axis direction.

Note that regarding the scale 240, although the number of pairs arranged in the Y-axis direction is three in this exemplary embodiment, it is merely an example. That is, two or more than three pairs may be arranged in the Y-axis direction. Further, since each of the above-described pairs is composed of two scale gratings, the total number of scale gratings is preferably an even number.

Third Exemplary Embodiment

Figure 7:
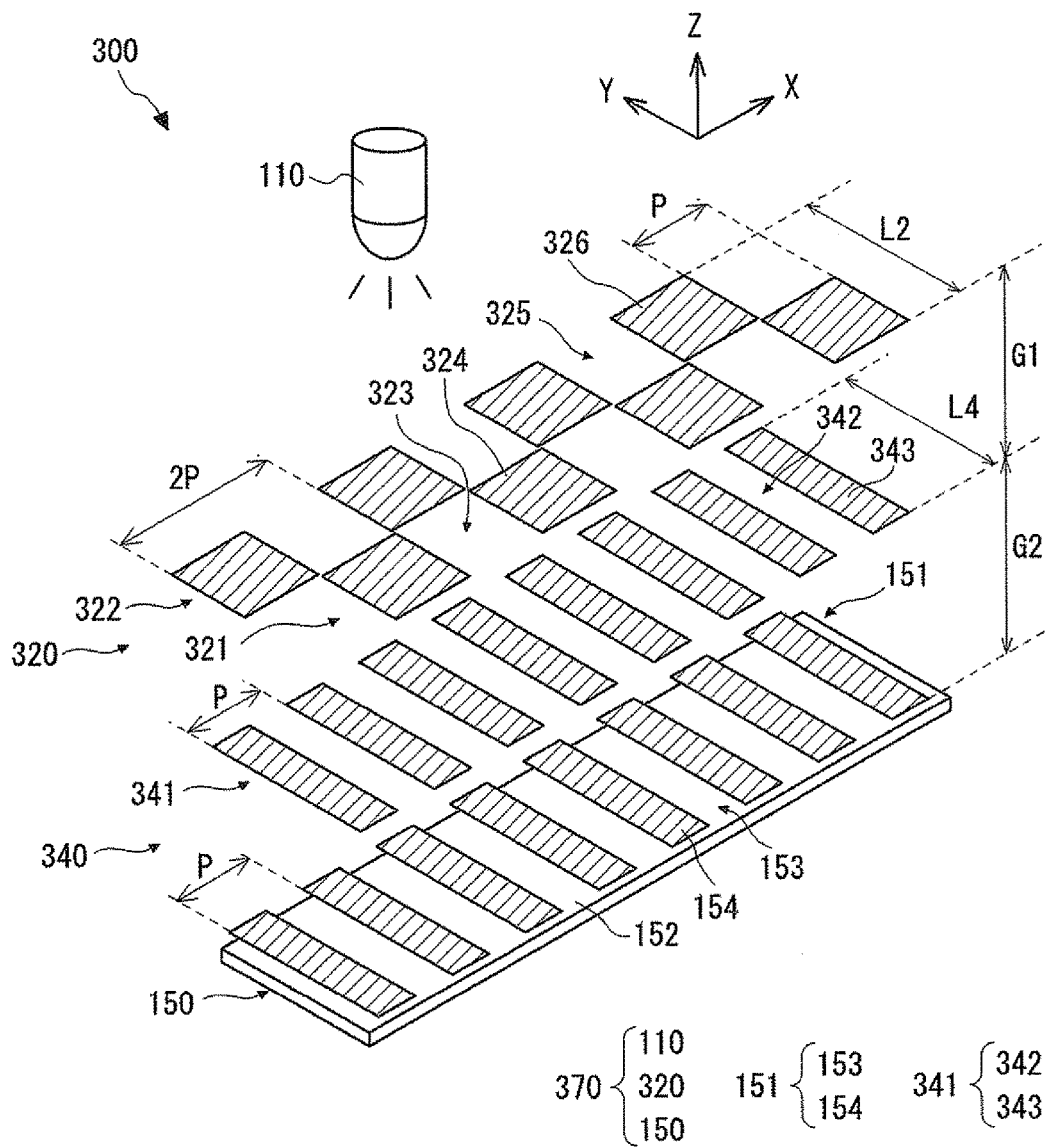
FIG. 7 is a perspective view schematically showing a configuration of an optical encoder according to a third exemplary embodiment.

An optical encoder 300 according to a third exemplary embodiment is explained. FIG. 7 is a perspective view schematically showing a configuration of the optical encoder 300 according to the third exemplary embodiment. The optical encoder 300 has a configuration that is obtained by replacing the scale 140 and the detection head 170 with a scale 340 and a detection head 370, respectively, in the optical encoder 100 according to the first exemplary embodiment.

The scale 340 includes a scale grating 341. The scale grating 341 has a configuration similar to that of the first scale grating 141 of the scale 140 of the optical encoder 100 according to the first exemplary embodiment, except that the length of the light-transmitting parts and the non-transmitting parts in the Y-axis direction differs from that of the first scale grating 141. The light-transmitting parts 342 and the non-transmitting parts 343 of the scale grating 341 correspond to the light-transmitting parts 143 and the non-transmitting parts 144, respectively, of the first scale grating 141.

The detection head 370 has a configuration that is obtained by replacing the light source grating 120 with a light source grating 320 in the detection head 170 according to the first exemplary embodiment. In the light source grating 320, a first grating 321 and a second grating 322 are disposed on a glass substrate (not shown). A plurality of unit gratings constituting the first grating 321 are alternately arranged in the measurement direction (X-axis direction). Similarly, a plurality of unit gratings constituting the second grating 322 are alternately arranged in the measurement direction (X-axis direction). Further, the first and second gratings 321 and 322 are arranged side by side in the Y-axis direction on the light source grating 320.

The first grating 321 includes light-transmitting parts 323 and non-transmitting parts 324. The light-transmitting parts 323 and the non-transmitting parts 324 are alternately arranged in the measurement direction (X-axis direction) in the double period 2P. The second grating 322 includes light-transmitting parts 325 and non-transmitting parts 326. The light-transmitting parts 325 and the non-transmitting parts 326 are alternately arranged in the measurement direction (X-axis direction) in the double period 2P. Note that the first and second gratings 321 and 322 are arranged in the measurement direction (X-axis direction) in such a manner that they are shifted from each other by the period P.

That is, by using the above-described light source grating 320, the optical encoder 300 can achieve an optical behavior similar to the optical behavior that is obtained by arranging two scale gratings so that they are shifted from each other by the half period in the measurement direction in the scale 140 of the optical encoder 100 or in the scale 240 of the optical encoder 200.

As described above, according to this configuration, similarly to the optical encoder 100 according to the first exemplary embodiment, the strength (i.e., the intensity) of the light detected by the photo diode 152 becomes uniform every time the detection head 370 is displaced relative to the scale 340 by the half period (P/2) in the measurement direction (X-axis direction). As a result, it is possible to make the strengths of the peaks, which occur at intervals of the half period (P/2) in the detection signal output from the photo diode 152, uniform.

Further, similarly to the second exemplary embodiment, two pairs or more each of which is substantially composed of the first grating 321 and the second grating 322 may be arranged side by side in the Y-axis direction in the light source grating in this exemplary embodiment. In this case, similarly to the second exemplary embodiment, it is possible to reduce the interpolation error in the detection signal output from the photo diode 152 that is caused when the light source grating 320 and the scale 340 are displaced in the Y-axis direction. Note that since each of the above-described pairs is composed of two gratings, the total number of gratings disposed in the light source grating is preferably an even number.

Fourth Exemplary Embodiment

Figure 8:
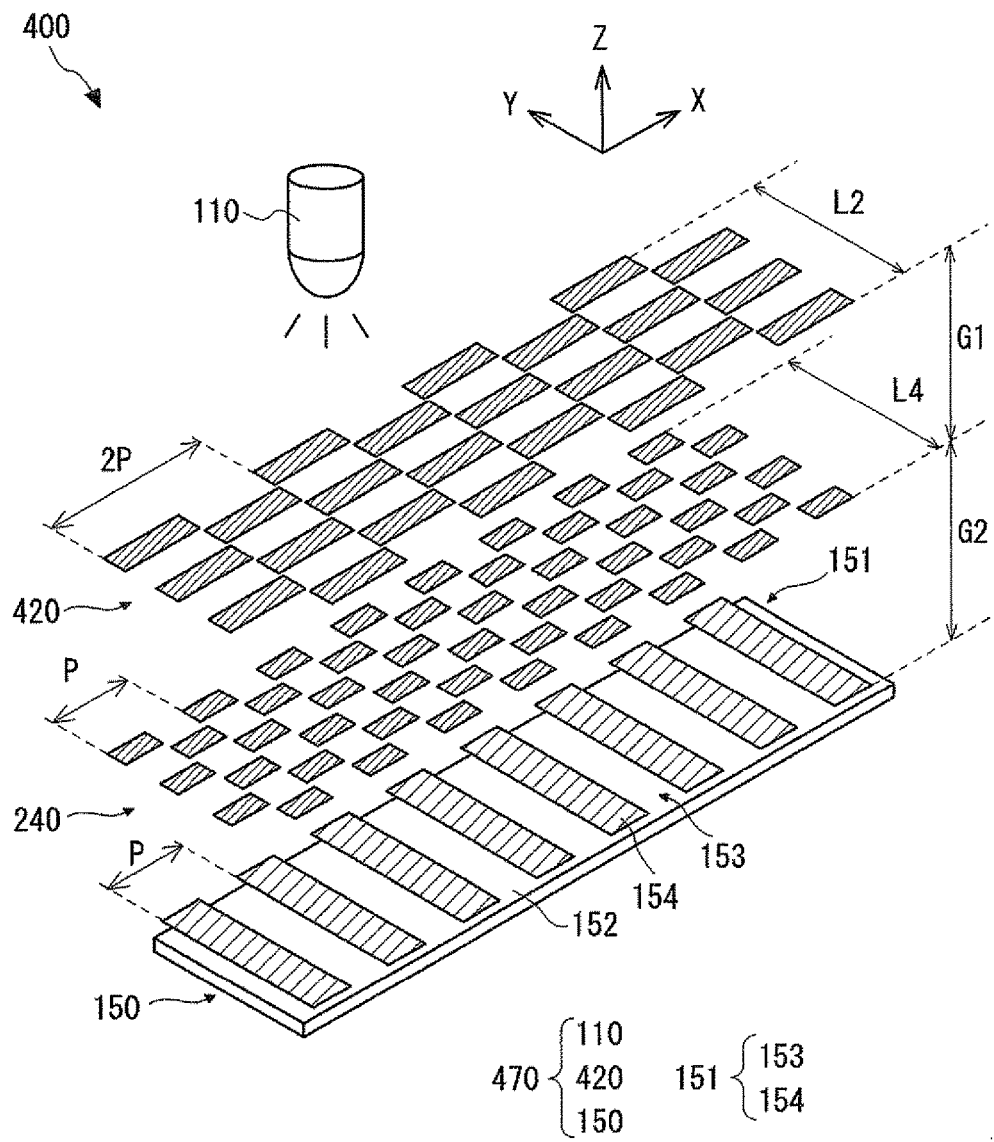
FIG. 8 is a perspective view schematically showing a configuration of an optical encoder according to a fourth exemplary embodiment.

An optical encoder 400 according to a fourth exemplary embodiment is explained. FIG. 8 is a perspective view schematically showing a configuration of the optical encoder 400 according to the fourth exemplary embodiment. The optical encoder 400 has a configuration that is obtained by replacing the detection head 170 with a detection head 470 in the optical encoder 200 according to the second exemplary embodiment.

Figure 9:
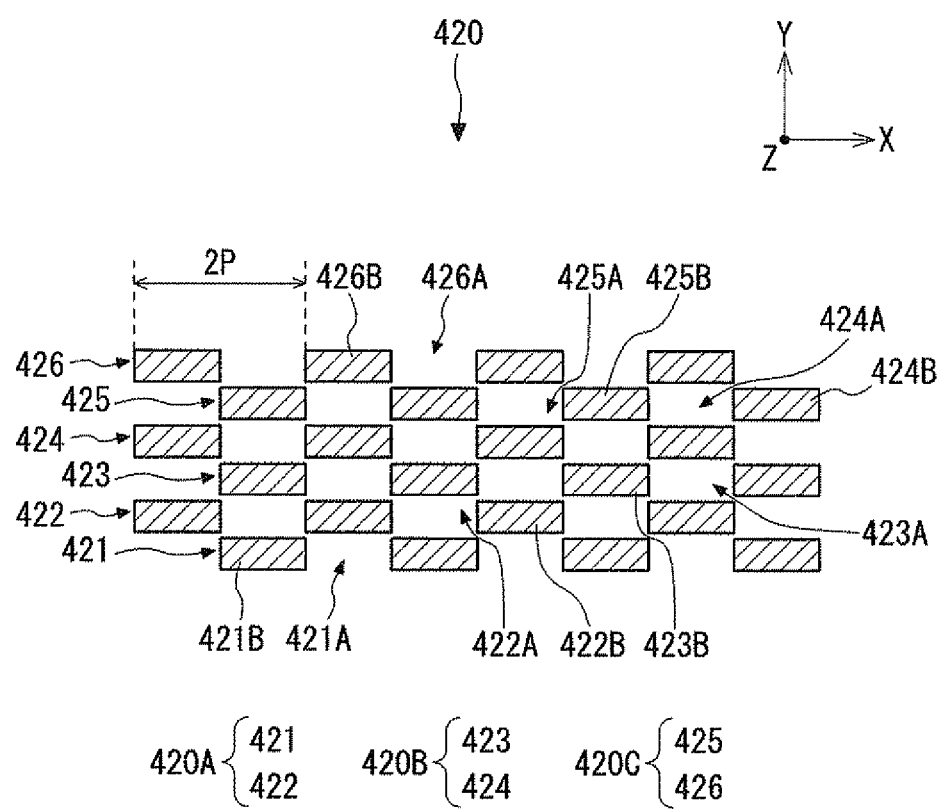
FIG. 9 is a top view schematically showing a configuration of a light source grating according to the fourth exemplary embodiment.

The detection head 470 has a configuration that is obtained by replacing the light source grating 120 with a light source grating 420 in the detection head 170. FIG. 9 is a top view schematically showing a configuration of the light source grating 420 according to the fourth exemplary embodiment. The light source grating 420 includes a first grating 421, a second grating 422, a third grating 423, a fourth grating 424, a fifth grating 425, and a sixth grating 426 arranged in the Y-axis direction in this listed order on a glass substrate (not shown).

Each of the first, third and fifth gratings 421, 423 and 425 has a configuration similar to that of the first grating 321 of the optical encoder 300, except that the length of the light-transmitting parts and the non-transmitting parts in the Y-axis direction differs from that of the first grating 321. Each of the second, fourth and sixth gratings 422, 424 and 426 has a configuration similar to that of the second grating 322 of the optical encoder 300, except that the length of the light-transmitting parts and the non-transmitting parts in the Y-axis direction differs from that of the second grating 322.

In FIG. 9, the light-transmitting parts 421A and the non-transmitting parts 421B of the first grating 421 correspond to the light-transmitting parts 323 and the non-transmitting parts 324, respectively, of the first grating 321. The light-transmitting parts 422A and the non-transmitting parts 422B of the second grating 422 correspond to the light-transmitting parts 325 and the non-transmitting parts 326, respectively, of the second grating 322. The light-transmitting parts 423A and the non-transmitting parts 423B of the third grating 423 correspond to the light-transmitting parts 323 and the non-transmitting parts 324, respectively, of the first grating 321. The light-transmitting parts 424A and the non-transmitting parts 424B of the fourth grating 424 correspond to the light-transmitting parts 325 and the non-transmitting parts 326, respectively, of the second grating 322. The light-transmitting parts 425A and the non-transmitting parts 425B of the fifth grating 425 correspond to the light-transmitting parts 323 and the non-transmitting parts 324, respectively, of the first grating 321. The light-transmitting parts 426A and the non-transmitting parts 426B of the sixth grating 426 correspond to the light-transmitting parts 325 and the non-transmitting parts 326, respectively, of the second grating 322.

That is, it can be understood that the light source grating 420 has substantially a configuration in which three pairs each of which is composed of the first and second gratings 321 and 322 according to the third exemplary embodiment are arranged in the Y-axis direction. In FIGS. 8 and 9, the pair of the first grating 421 (corresponding to the first grating 321) and the second grating 422 (corresponding to the second grating 322) is referred to as a "pair 420A". The pair of the third grating 423 (corresponding to the first grating 321) and the fourth grating 424 (corresponding to the second grating 322) is referred to as a "pair 420B". The pair of the fifth grating 425 (corresponding to the first grating 321) and the sixth grating 426 (corresponding to the second grating 322) is referred to as a "pair 420C". The other configuration of the optical encoder 400 is similar to that of the optical encoder 200 and therefore its explanation is omitted.

As described above, according to this configuration, similarly to the optical encoders according to the above-described exemplary embodiments, the strength (i.e., the intensity) of the light detected by the photo diode 152 becomes uniform every time the detection head 470 is displaced relative to the scale 240 by the half period (P/2) in the measurement direction (X-axis direction). As a result, it is possible to make the strengths of the peaks, which occur at intervals of the half period (P/2) in the detection signal output from the photo diode 152, uniform.

Further, according to this configuration, as explained in the second exemplary embodiment, it is possible to reduce the interpolation error in the detection signal output from the photo diode 152 that is caused when the light source grating 420 and the scale 240 are displaced in the Y-axis direction.

Further, in this configuration, the three pairs 420A, 420B and 420C are arranged in the Y-axis direction in a repeated manner in the light source grating 420. Therefore, it is possible to reduce the interpolation error in the detection signal output from the photo diode 152 that is caused when the light source grating 420 and the scale 240 are displaced in the Y-axis direction even further.

Note that similarly to the optical encoder 300, only one pair substantially composed of the first and second gratings 321 and 322 may be disposed in the light source grating. Further, two or more than three pairs each of which is composed of the first and second gratings 321 and 322 may be arranged in the Y-axis direction in the light source grating. Note that since each of the above-described pairs is composed of two gratings, the total number of gratings disposed in the light source grating is preferably an even number.

Fifth Exemplary Embodiment

Figure 10:
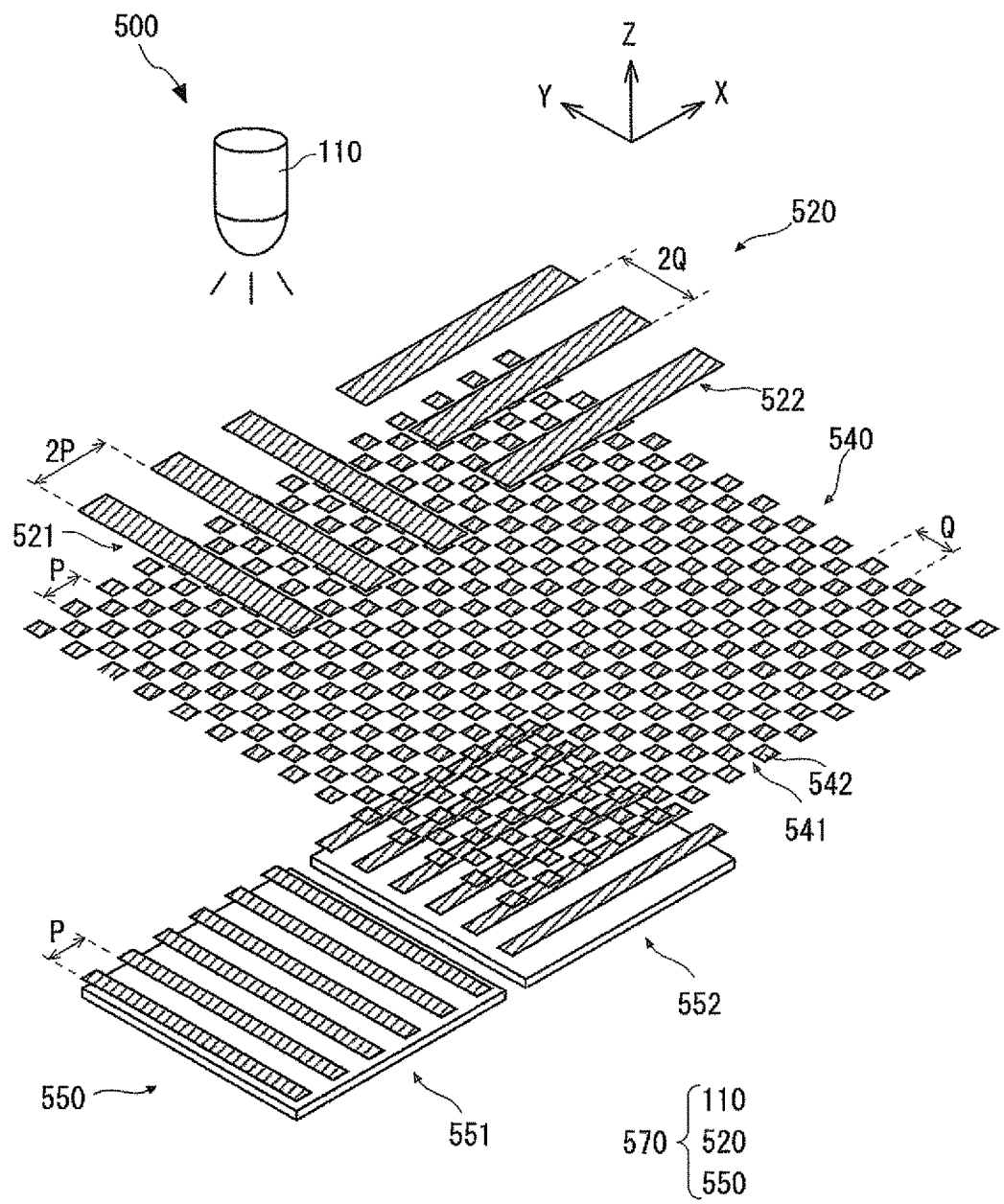
FIG. 10 is a perspective view schematically showing a configuration of an optical encoder according to a fifth exemplary embodiment.

An optical encoder 500 according to a fifth exemplary embodiment is explained. FIG. 10 is a perspective view schematically showing a configuration of the optical encoder 500 according to the fifth exemplary embodiment. The optical encoder 500 is configured as an optical encoder capable of detecting displacements in the X- and Y-axis directions. The displacement detection in the X-axis direction is carried out based on a principle similar to that for the optical encoder 100 according to the first exemplary embodiment. That is, in the displacement detection in the X-axis direction, the above-described first and second interference fringes are detected. The displacement detection in the Y-axis direction is carried out in a form that is obtained by rotating the optical encoder 100 according to the first exemplary embodiment by 90°. That is, in the displacement detection in the Y-axis direction, third and fourth interference fringes corresponding to the first and second interference fringes, respectively, in the optical encoder 100 are detected. The optical encoder 500 includes a scale 540 and a detection head 570.

Figure 11:
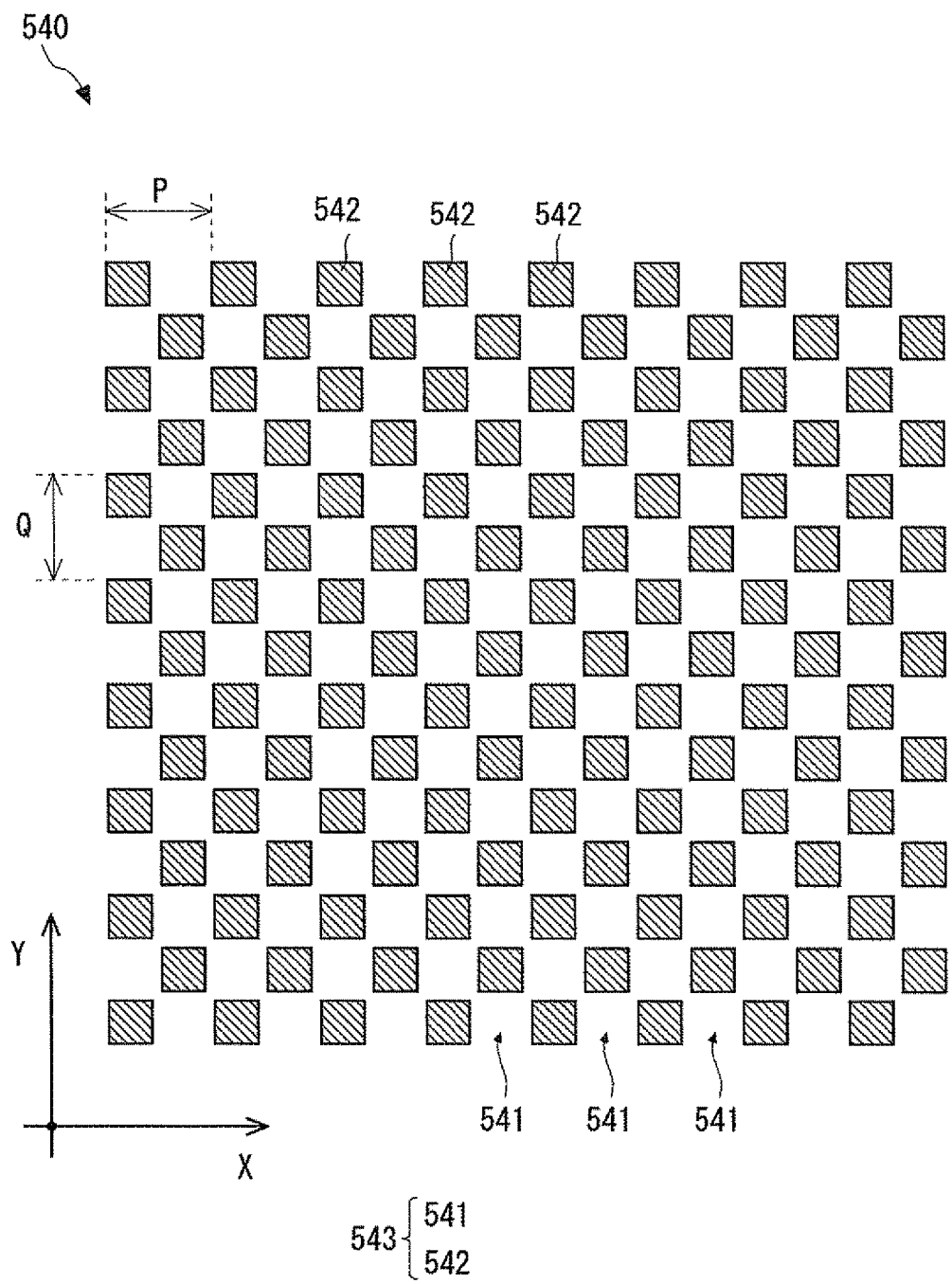
FIG. 11 is a top view schematically showing a configuration of a scale according to the fifth exemplary embodiment.

The scale 540 is explained in detail. FIG. 11 is a top view schematically showing a configuration of the scale 540 according to the fifth exemplary embodiment. In the scale 540, a grating 543 is formed on a glass substrate (not shown). In the grating 543, rectangle (or square) non-transmitting parts 542 are arranged in a staggered pattern over a two-dimensional area. The parts where the non-transmitting parts 542 are not disposed serve as light-transmitting parts 541 through which light passes. The period (i.e., the cycle) of the grating 543 in the X-axis direction is a period P (also referred to as a "first period") and the period (i.e., the cycle) in the Y-axis direction is a period Q (also referred to as a "second period"). Note that the arrangement of the grating 543 can also be regarded as an arrangement in which a plurality of scale gratings in each of which light-transmitting parts 541 and non-transmitting parts 542 are alternately arranged in the X-axis direction are arranged in the Y-axis direction in such a manner that neighboring scale gratings are shifted from each other by a half period.

The detection head 570 is explained. The detection head 570 includes a light source 110, an X-axis direction light source grating 521, a Y-axis direction light source grating 522, and interference fringe detection means 550. The X-axis direction light source grating 521 and the Y-axis direction light source grating 522 are disposed on the same plane (X-Y plane). Though it is not shown in the figure, the X-axis direction light source grating 521 and the Y-axis direction light source grating 522 are disposed so that the gap between the X- and Y-axis direction light source gratings 521 and 522 and the scale 540 is equal to the gap between the scale 540 and the interference fringe detection means 550.

Figure 12:
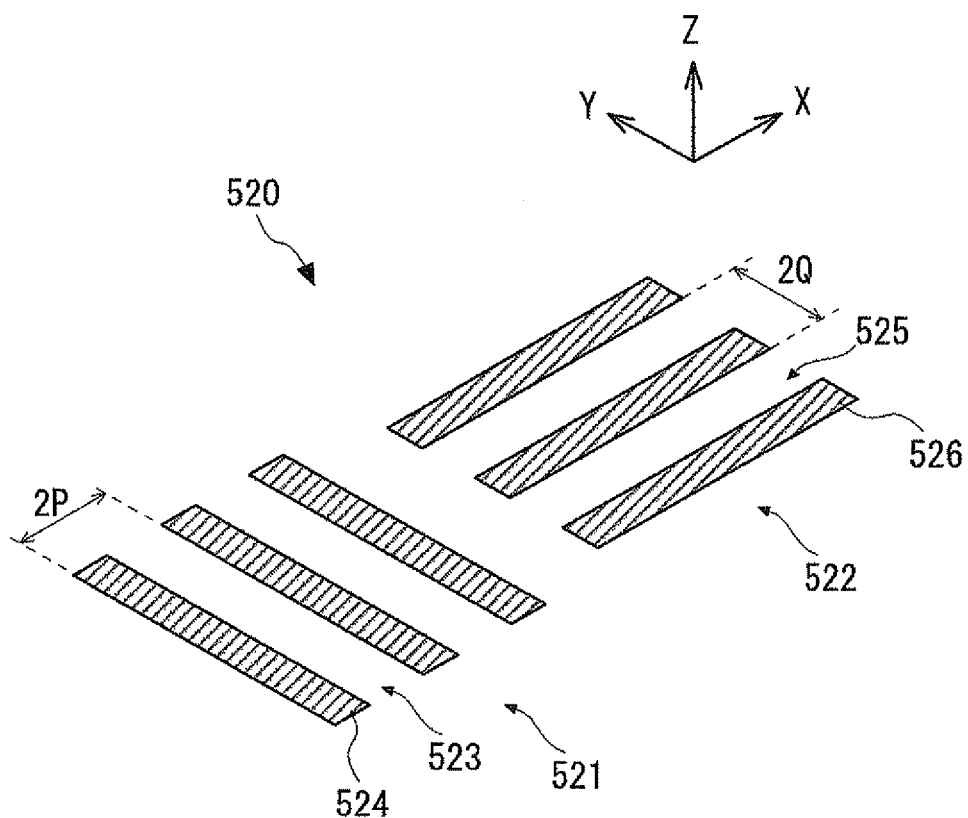
FIG. 12 is a perspective view schematically showing a configuration of an X-axis direction light source grating and a Y-axis direction light source grating according to the fifth exemplary embodiment.

FIG. 12 is a perspective view schematically showing a configuration of the X- and Y-axis direction light source gratings 521 and 522 according to the fifth exemplary embodiment. In the X-axis direction light source grating 521, light-transmitting parts 523 and non-transmitting parts 524 are alternately arranged in the X-axis direction in a double period 2P. In the Y-axis direction light source grating 522, light-transmitting parts 525 and non-transmitting parts 526 are alternately arranged in the Y-axis direction in a double period 2Q.

Figure 13:
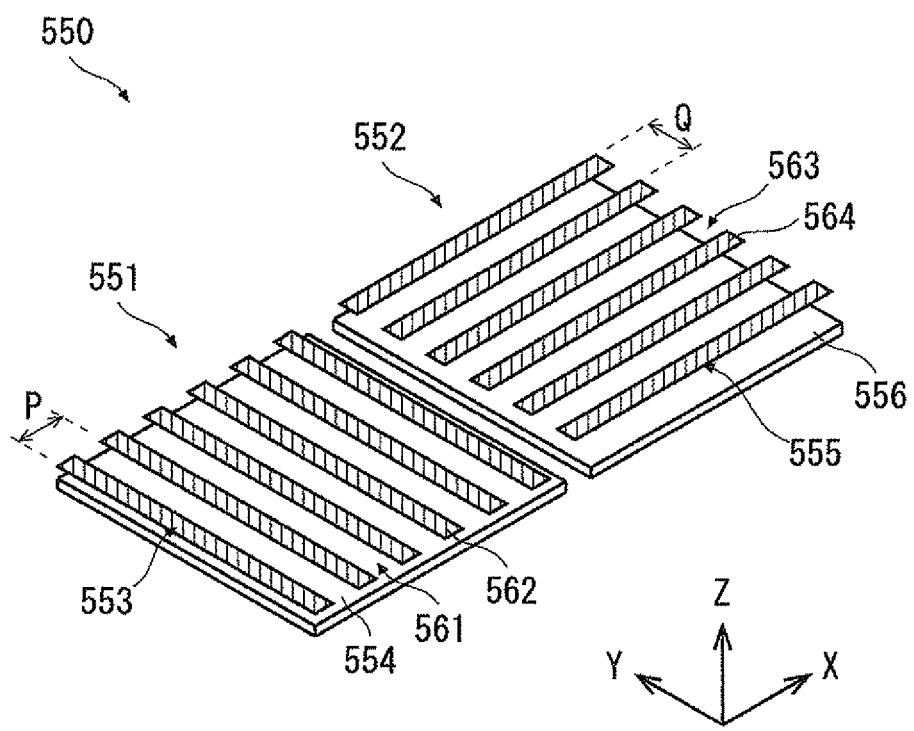
FIG. 13 is a perspective view schematically showing a configuration of interference fringe detection means according to the fifth exemplary embodiment.
Figure 14:
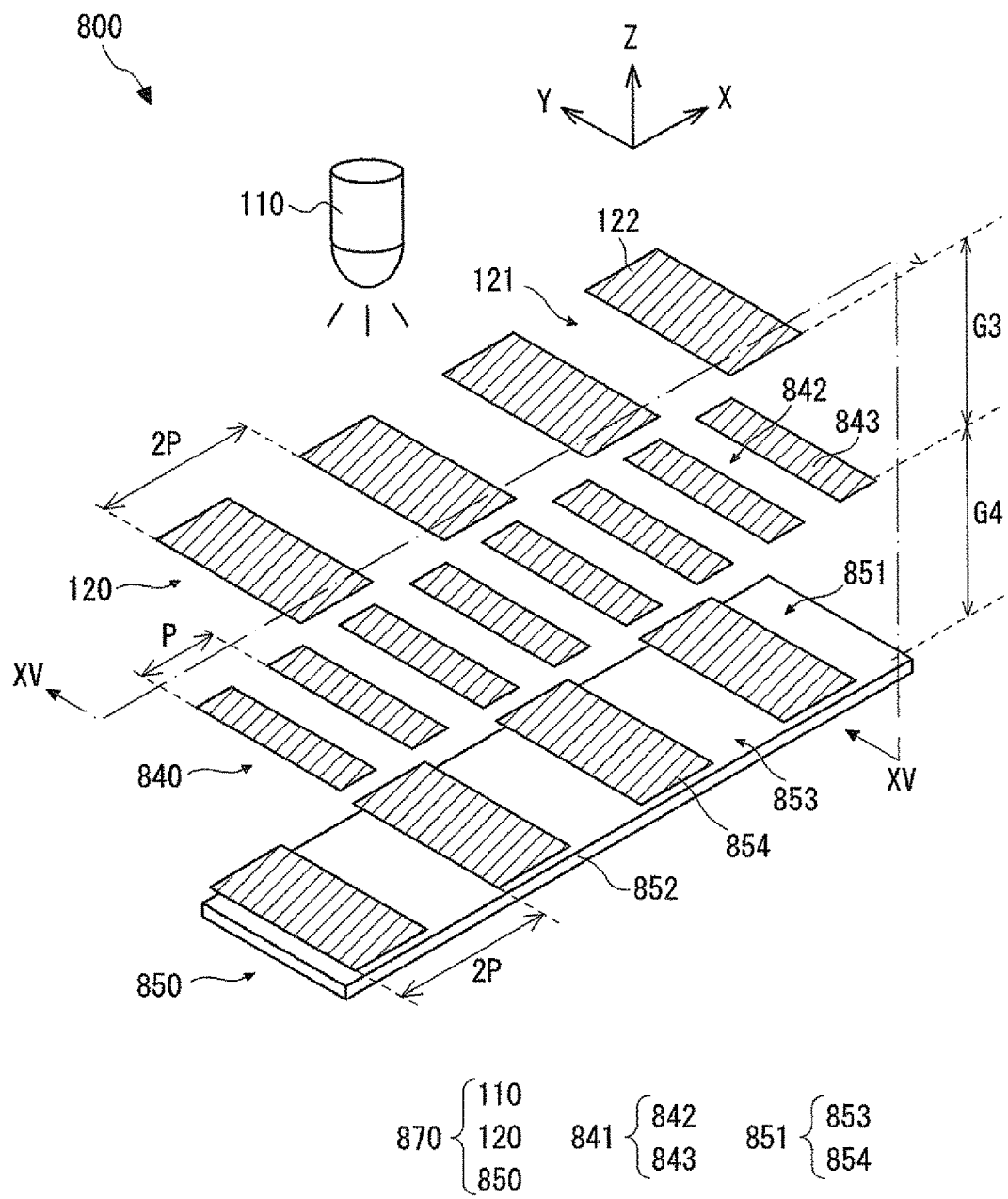
FIG. 14 is a perspective view showing a configuration example of an optical encoder using a three-grating system.
Figure 15:
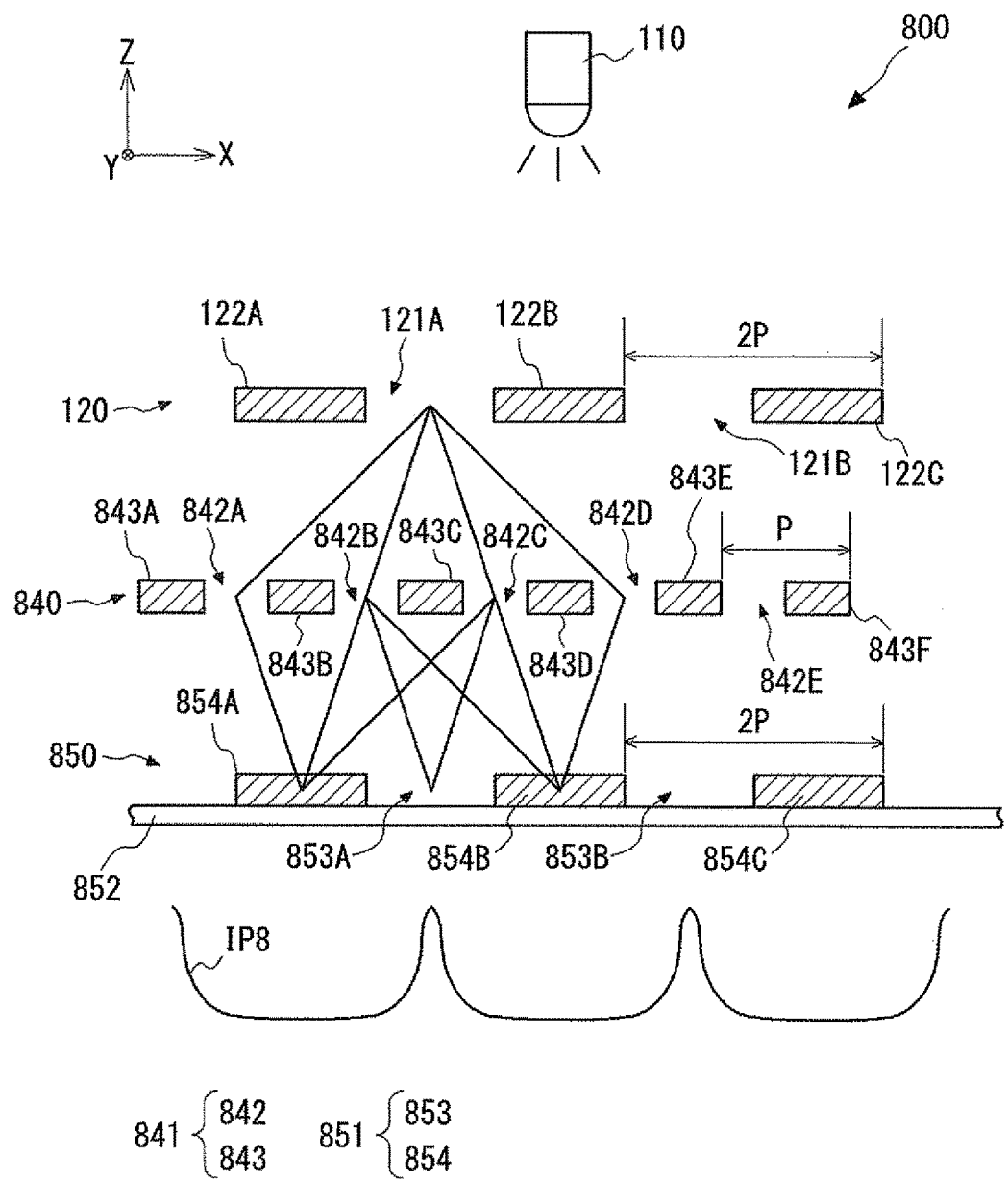
FIG. 15 schematically shows a cross-sectional configuration of a detection head and a scale in an initial state.
Figure 16:
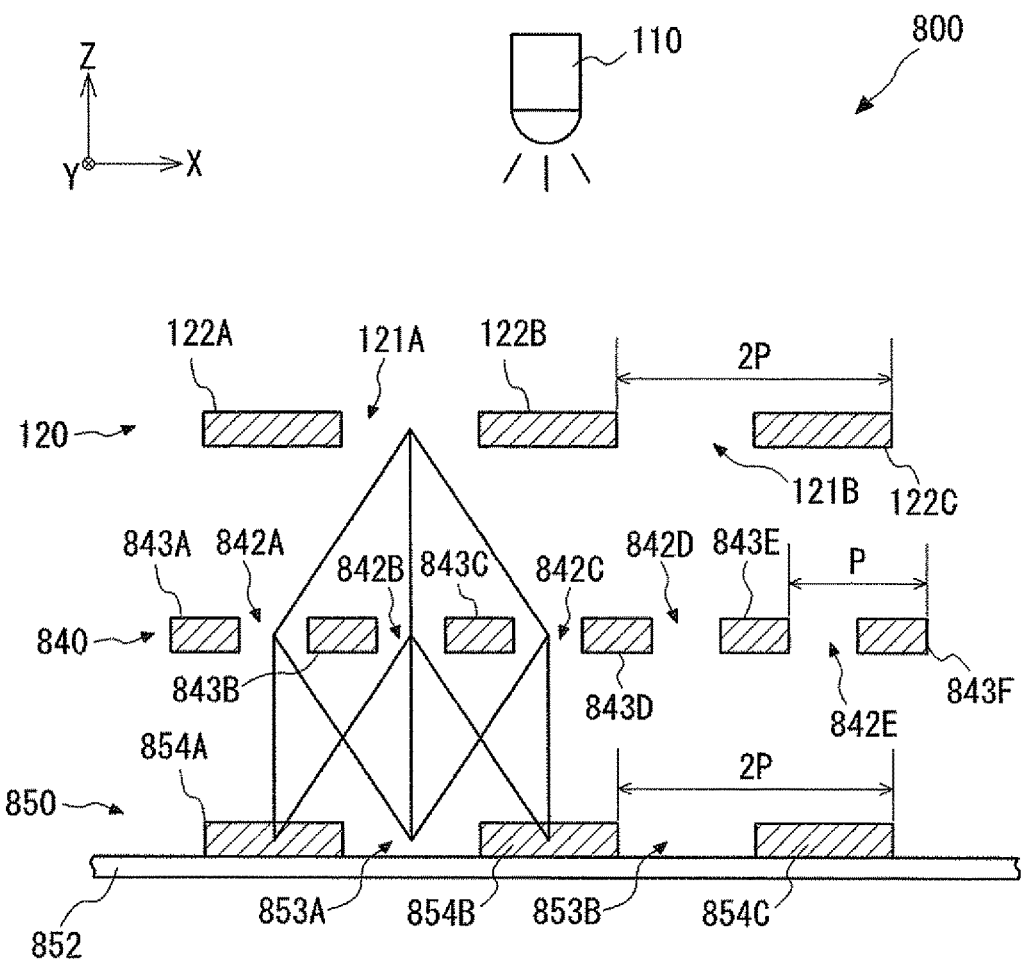
FIG. 16 schematically shows the cross-sectional configuration of the detection head and the scale in a subsequent state.
Figure 17:
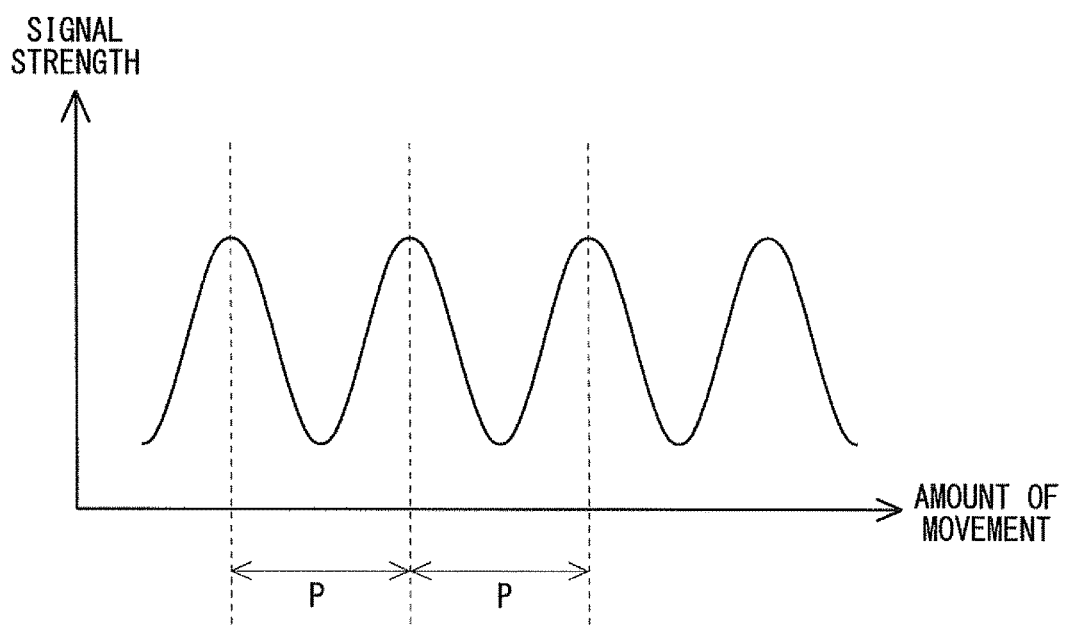
FIG. 17 shows changes in a detection signal resulting from a movement of a scale grating.

FIG. 13 is a perspective view schematically showing a configuration of the interference fringe detection means 550 according to the fifth exemplary embodiment. The interference fringe detection means 550 includes X-axis direction interference fringe detection means 551 for detecting interference fringes in the X-axis direction and Y-axis direction interference fringe detection means 552 for detecting interference fringes in the Y-axis direction. That is, the X-axis direction interference fringe detection means 551 detects an amount of a movement in the X-axis direction and the Y-axis direction interference fringe detection means 552 detects an amount of a movement in the Y-axis direction.

The X-axis direction interference fringe detection means 551 detects interference fringes formed by the X-axis direction light source grating 521 and the scale 540 (the above-described first and second interference fringes). The X-axis direction interference fringe detection means 551 includes an X-axis direction light receiving grating 553 and a first photo diode 554. In the X-axis direction light receiving grating 553, light-transmitting parts 561 and non-transmitting parts 562 are arranged in the X-axis direction with a period P.

The Y-axis direction interference fringe detection means 552 detects interference fringes formed by the Y-axis direction light source grating 522 and the scale 540 (the above-described third and fourth interference fringes). The Y-axis direction interference fringe detection means 552 includes a Y-axis direction light receiving grating 555 and a second photo diode 556. In the Y-axis direction light receiving grating 555, light-transmitting parts 563 and non-transmitting parts 564 are arranged in the Y-axis direction with a period Q.

The grating periods (i.e., the grating cycles) in the X- and Y-axis directions of the scale 540, the X-axis direction light receiving grating 553, and Y-axis direction light receiving grating 555 may be equal to each other (i.e., P=Q). That is, the grating periods in the X- and Y-axis directions of the X-axis direction light source grating 521 and the Y-axis direction light source grating 522 may be equal to each other (i.e., 2P=2Q). When the period P is equal to the period Q (i.e., P=Q), it means that the grating 543 includes square light-transmitting parts 541 and square non-transmitting parts 542. As a result, the resolution for the detection of an amount of a movement in the X-axis direction of the optical encoder 500 is equal to the resolution therefor in the Y-axis direction.

As explained above, the optical encoder 500 according to this exemplary embodiment has a configuration that is obtained by combining the configuration of the optical encoder 200 with a configuration obtained by rotating the optical encoder 200 around the Z-axis direction, which is the direction perpendicular to the X-Y plane, by 90°. As a result, it is possible to provide an optical encoder capable of providing a detection signal having a resolution of a half period (P/2) for the period P in the X-axis direction and a resolution of a half period (Q/2) for the period Q in the Y-axis direction.

Note that similarly to the third and fourth exemplary embodiments, in the X-axis direction light source grating 521, one or a plurality of pairs each of which is composed of a grating having a double period 2P and a grating disposed so as to be shifted in the X-axis direction by a period P may be arranged side by side in the Y-axis direction. In this case, it is possible to reduce the interpolation error in the detection signal output from the first photo diode 554 that is caused when the X-axis direction light source grating 521 and the scale 540 are displaced in the Y-axis direction.

Similarly to the third and fourth exemplary embodiments, in the Y-axis direction light source grating 522, one or a plurality of pairs each of which is composed of a grating having a double period 2Q and a grating disposed so as to be shifted in the Y-axis direction by a period Q may be arranged side by side in the X-axis direction. In this case, it is possible to reduce the interpolation error in the detection signal output from the second photo diode 556 that is caused when the Y-axis direction light source grating 522 and the scale 540 are displaced in the X-axis direction.

Other Exemplary Embodiments

Further, the present invention is not limited to the aforementioned exemplary embodiments and may be changed as appropriate without departing from the spirit of the present invention. For example, in the above-described exemplary embodiments, it is possible to form the non-transmitting parts of the scale by using a material having a high reflectivity and thereby form them as light-reflecting parts. That is, it is possible to form the scale as a reflective-type scale. In this case, the interference fringe detection means may be disposed on the side of the scale on which the light source 110 is disposed.

Further, when the light-transmitting parts and the light-reflecting parts have the same shape as each other in the optical encoder 500 according to the fifth exemplary embodiment, the optical encoder 500 can be used as both a transmitting-type encoder and a reflection-type encoder. When the optical encoder 500 is constructed as a reflection-type encoder, the amount of light reflected on the grating 543 increases because the ratio between the size of the light-transmitting parts and that of the light-transmitting parts (the non-transmitting parts) is 1:1. As a result, it is possible to provide a reflection-type encoder that outputs a strong (or large) detection signal.

Although the above-described exemplary embodiments are explained on the assumption that the light source grating, the scale, and the light receiving grating are formed by using glass substrates, they are merely examples. The light source grating, the scale, and the light receiving grating may be formed by using transparent substrates made of material other than glass. Alternatively, each of the light source grating, the scale, and the light receiving grating may be formed by using apertures formed in an opaque substrate as light-transmitting parts.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical encoder comprising:
    a light source that emits light;
    a scale comprising a scale grating formed with a predetermined period;
    a light source grating comprising a grating formed with a period twice the predetermined period, the light source grating being disposed between the light source and the scale; and
    interference fringe detection means configured to be able to detect a bright part of an interference fringe with the predetermined period, the interference fringe being generated by the light source grating and the scale, wherein
    the interference fringe detection means detects a first interference fringe formed by light coming from the scale and a second interference fringe formed by light coming from the scale, a position of a bright part of the second interference fringe being shifted from a position of a bright part of the first interference fringe by the predetermined period,
    the scale comprises at least two scale gratings formed with the predetermined period, and
    the at least two scale gratings are arranged in parallel and neighboring scale gratings are shifted from each other by a half of the predetermined period.

2. The optical encoder according to claim 1, wherein the scale comprises an even number of scale gratings.

3. The optical encoder according to claim 1, wherein a width of an area where the at least two scale gratings are arranged is shorter than a width of the light source grating, the widths being widths in a direction in which the at least two scale gratings are arranged in parallel.

4. An optical encoder comprising:
    a light source that emits light;
    a scale comprising a scale grating formed with a predetermined period;
    a light source grating comprising a grating formed with a period twice the predetermined period, the light source grating being disposed between the light source and the scale; and
    interference fringe detection means configured to be able to detect a bright part of an interference fringe with the predetermined period, the interference fringe being generated by the light source grating and the scale, wherein
    the interference fringe detection means detects a first interference fringe formed by light coming from the scale and a second interference fringe formed by light coming from the scale, a position of a bright part of the second interference fringe being shifted from a position of a bright part of the first interference fringe by the predetermined period,
    the light source grating comprises at least two gratings formed with the period twice the predetermined period, and
    the at least two gratings are arranged in parallel and neighboring gratings are shifted from each other by the predetermined period.

5. The optical encoder according to claim 4, wherein the light source grating comprises an even number of gratings.

6. The optical encoder according to claim 1, wherein the interference fringe detection means detects an interference fringe in which the first and second interference fringes are combined.

7. The optical encoder according to claim 1, wherein the interference fringe detection means comprises:
    a light receiving grating comprising a grating formed with the predetermined period; and
    light receiving means for detecting light that has passed through the light receiving grating.

8. An optical encoder comprising:
    a light source that emits light;
    a scale comprising a staggered-pattern grating formed on a predetermined plane with a first period in an X-axis direction and a second period in a Y-axis direction, the X-axis direction being in parallel with the predetermined plane, the Y-axis direction being in parallel with the predetermined plane and intersecting the X-axis direction;
    an X-axis direction light source grating comprising a grating formed in the X-axis direction with a period twice the first period, the X-axis light source grating being disposed between the light source and the scale;
    a Y-axis direction light source grating comprising a grating formed in the Y-axis direction with a period twice the second period, the Y-axis light source grating being disposed between the light source and the scale;
    X-axis direction interference fringe detection means configured to be able to detect a bright part of an interference fringe with the first period, the interference fringe being generated by the X-axis direction light source grating and the scale; and
    Y-axis direction interference fringe detection means configured to be able to detect a bright part of an interference fringe with the second period, the interference fringe being generated by the Y-axis direction light source grating and the scale, wherein
    the X-axis direction interference fringe detection means detects a first interference fringe formed by light coming from the scale and a second interference fringe formed by light coming from the scale, a position of a bright part of the second interference fringe being shifted from a position of a bright part of the first interference fringe by the first period, and
    the Y-axis direction interference fringe detection means detects a third interference fringe formed by light coming from the scale and a fourth interference fringe formed by light coming from the scale, a position of a bright part of the fourth interference fringe being shifted from a position of a bright part of the third interference fringe by the second period.

* * * * *